US011161094B2

(12) United States Patent
Mohamed et al.

(10) Patent No.: US 11,161,094 B2
(45) Date of Patent: Nov. 2, 2021

(54) TITANIA-CARBON DOT-REDUCED GRAPHENE OXIDE COMPOSITES, THEIR MAKE, AND USE

(71) Applicant: Imam Abdulrahman Bin Faisal University, Dammam (SA)

(72) Inventors: Hanan Hussein Amin Mohamed, Dammam (SA); Aamerah Abdulwahab Alsanea, Dammam (SA)

(73) Assignee: Imam Abdulrahman Bin Faisal University, Dammam (SA)

(*) Notice: Subject to any disclaimer, the term of this patent is extended or adjusted under 35 U.S.C. 154(b) by 260 days.

(21) Appl. No.: 16/400,405

(22) Filed: May 1, 2019

(65) Prior Publication Data

US 2020/0346187 A1 Nov. 5, 2020

(51) Int. Cl.
*B01J 21/18* (2006.01)
*B01J 35/10* (2006.01)
(Continued)

(52) U.S. Cl.
CPC ............. *B01J 21/18* (2013.01); *B01J 35/004* (2013.01); *B01J 35/0013* (2013.01);
(Continued)

(58) Field of Classification Search
CPC ........ B01J 35/1019; B01J 21/18; B01J 37/08; B01J 35/00; B01J 35/02; B01J 22/18; B01J 35/1061; C10B 53/07; C02F 1/32
See application file for complete search history.

(56) References Cited

U.S. PATENT DOCUMENTS

2015/0069295 A1 3/2015 Ho et al.
2018/0229219 A1* 8/2018 Islam ................. B01J 35/004

FOREIGN PATENT DOCUMENTS

CN 106076378 A 11/2016
CN 106238104 A 12/2016
(Continued)

OTHER PUBLICATIONS

Zeng, et al. ; Highly dispersed TiO2nanocrystals and carbon dots on reducedgraphene oxide: Ternary nanocomposites for acceleratedphotocatalytic water disinfection ; Applied Catalysis B: Environmental 202 ; pp. 34-41 ; Sep. 5, 2016 ; 10 Pages.
(Continued)

*Primary Examiner* — Walter D. Griffin
*Assistant Examiner* — Cameron J Allen
(74) *Attorney, Agent, or Firm* — Oblon, McClelland, Maier & Neustadt, L.L.P.

(57) ABSTRACT

Catalytic pyrolysis can upcycle waste, e.g., car bumpers, to carbon nanomaterials, preferably using synthetic $TiO_2$ nanoparticles as catalyst during pyrolysis. Analysis of the carbon nanomaterials shows that, while RGO is produced from thermal pyrolysis of car bumper waste absent $TiO_2$, RGO spotted with carbon dots is produced in presence of $TiO_2$ catalyst. Rutile to anatase $TiO_2$ phase transformation and carbon nanomaterial formation can simultaneously occur during the pyrolysis. Anatase to rutile transformation may occur while $TiO_2$ absent the bumper material. Such $TiO_2$-CD-RGO can be used, for example in photocatalytic degradation of organic compounds, such as methylene blue.

20 Claims, 18 Drawing Sheets

(51) Int. Cl.
  *B01J 37/08* (2006.01)
  *B01J 35/00* (2006.01)
  *B01J 35/02* (2006.01)
  *C10B 53/07* (2006.01)
  *C02F 1/32* (2006.01)
  *C02F 1/72* (2006.01)
  *C02F 103/34* (2006.01)
  *C02F 101/30* (2006.01)

(52) U.S. Cl.
  CPC ......... *B01J 35/023* (2013.01); *B01J 35/1014* (2013.01); *B01J 35/1019* (2013.01); *B01J 35/1038* (2013.01); *B01J 35/1061* (2013.01); *B01J 37/084* (2013.01); *C02F 1/32* (2013.01); *C02F 1/725* (2013.01); *C10B 53/07* (2013.01); *C02F 2101/301* (2013.01); *C02F 2101/308* (2013.01); *C02F 2103/343* (2013.01); *C02F 2305/08* (2013.01); *C02F 2305/10* (2013.01)

(56) References Cited

FOREIGN PATENT DOCUMENTS

| CN | 106622202 A | * | 5/2017 |
| CN | 105268436 B | | 9/2017 |
| CN | 107626296 A | | 1/2018 |
| CN | 108906037 A | | 11/2018 |
| IN | 201611016081 | | 10/2017 |
| WO | 2011/132036 A1 | | 10/2011 |

OTHER PUBLICATIONS

Park, et al. ; Ultrasonic spray pyrolysis synthesis of reduced graphene oxide/anatase TiO composite and its application in the photocatalytic degradation of methylene blue in water ; Chemosphere vol. 191 ; pp. 738-746 ; Oct. 17, 2017 ; Abstract Only ; 3 Pages.

Truppi, et al. ; Visible-Light-Active TiO2-Based Hybrid Nanocatalysts for Environmental Applications ; MDPI catalysts ; Mar. 25, 2017 ; 33 Pages.

Mohamed, et al. ; Multifunctional TiO2 microspheres-rGO as highly active visible light photocatalyst and antimicrobial agent ; Materials Express vol. 8, No. 4 ; 2018 ; 8 Pages.

Feng, et al. ; Upcycle waste plastics to magnetic carbon materials for dye adsorption from polluted water† ; RSC Adv. 4 ; May 27, 2014 ; 8 Pages.

* cited by examiner

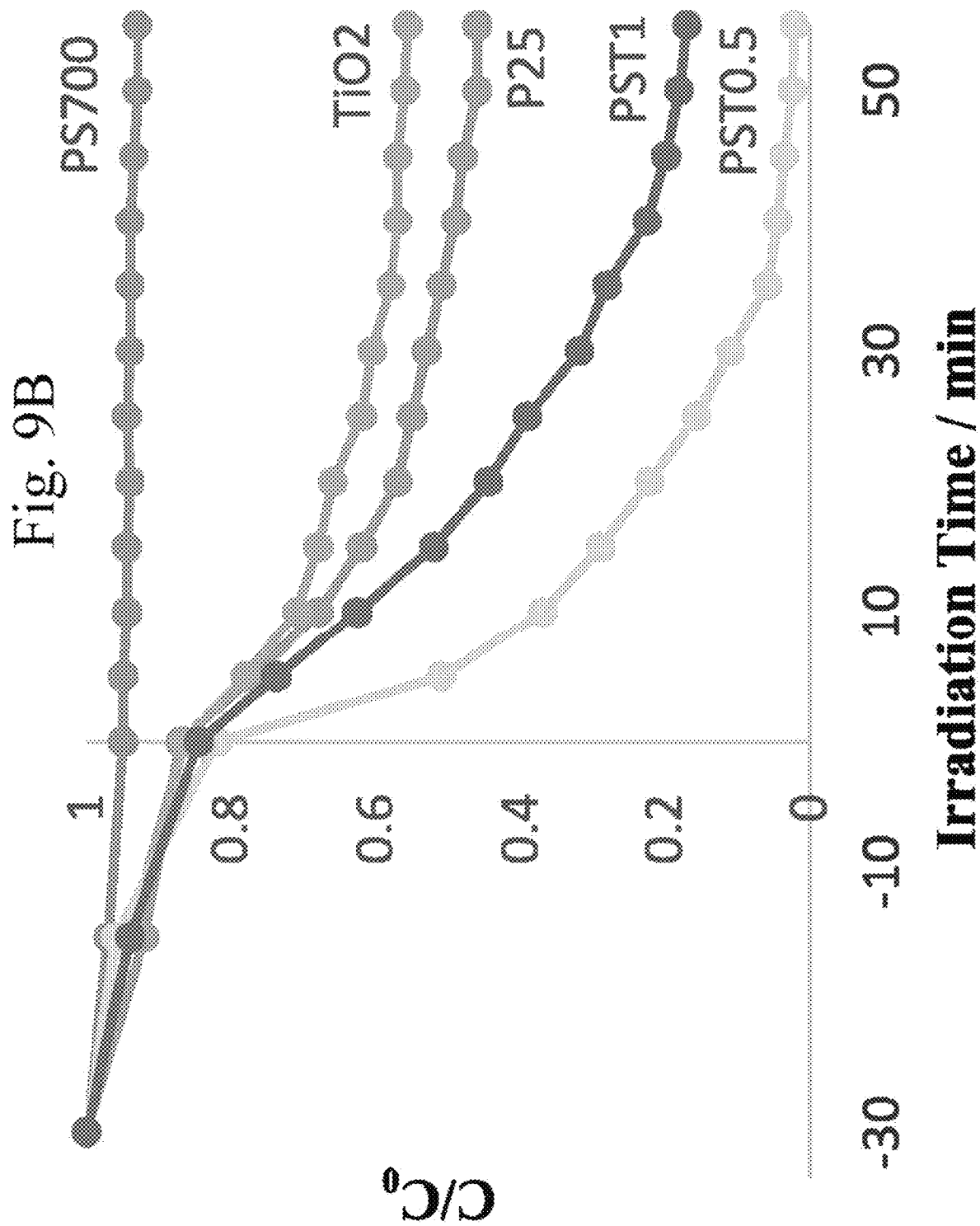

TITANIA-CARBON DOT-REDUCED GRAPHENE OXIDE COMPOSITES, THEIR MAKE, AND USE

STATEMENT REGARDING PRIOR DISCLOSURES BY INVENTOR(S)

Aspects of the present disclosure are described in "TiO$_2$/Carbon Dots Decorated Reduced Graphene Oxide Composites from Waste Car Bumper and TiO$_2$ Nanoparticles for Photocatalytic Applications," which was authored by the inventors and published online in Arab. J. Chem. 2018, on Sep. 7, 2018, which is incorporated herein by reference in its entirety.

BACKGROUND OF THE INVENTION

Field of the Invention

The present disclosure relates to materials and methods for waste management and/or water treatment, particularly in upcycling plastic waste to value added nanomaterials including reduced graphene oxide with embedded TiO$_2$ and which may be useful in, e.g., photocatalytic water treatment. Such methods and materials may provide a sustainable approach to create nanocomposites materials, particularly for photocatalytic applications, and methods of upcycling plastic waste materials.

Description of the Related Art

Due to the rapid economic development of industries and improvement of living standards throughout the world, waste from non-biodegradable, man-made materials, such as polymer waste, has increased dramatically. Examples of such polymer-based waste include but are not limited to, automobile parts, food packaging materials, electric components, and building materials. The world production of polymer-based waste reached 280 million tons in 2011.

Disposal of such huge quantities of waste into the environment is of great concern, and has become a challenge to address. The management of polymer waste is crucial to reduce environmental impact. Polymer waste can be managed by recycling processes in which waste materials are collected and processed or remanufactured (either biologically, mechanically, chemically, or thermally) into new products, and subsequently marketing the recycled-material products. Recycling is a favored method in the waste management hierarchy. However, the rate of global recycling is still not as high as would be economically and environmentally desirable. Therefore, "upcycling" processes for waste management have been developed in which the quality and value of the recycled products is upgraded.

Due to the fact that carbon is the major constituent of organic polymers, organic polymer waste can provide a carbon source for carbon-based value-added products. Such products may include light hydrocarbons, carbon black/activated carbon, carbon fibers, fullerenes, carbon nanotubes, nanodiamonds, and graphene. Converting waste plastics into such value-added products is an example of upcycling. Amongst carbon-based nanomaterials, reduced graphene oxide (RGO) and carbon nanotubes (CNTs) are promising for their extraordinary electrical properties, superior carrier transport, potentially high specific surface areas, and excellent thermal and/or chemical stability. In addition, carbon quantum dots (CDs) have been attracting more attention due to their chemical inertness, optical stability, biocompatibility, and low toxicity.

Amongst current technologies to transform plastic waste into value-added carbon-based nanomaterials, pyrolysis, i.e., thermal decomposition in inert atmosphere, has shown promise. Various products can be obtained from the pyrolysis of plastic waste, including liquid phase materials, such as gasoline and oils, and solid phase materials, such as carbon nanomaterials, in addition to gases. The composition, quality, and yield of the pyrolyzed polymer waste product can be affected by factors such as temperature, retention time, feedstock composition, use of catalyst, moisture content, heating rate, and particle size.

The use of catalyst is an important parameter in pyrolyzing polymer waste. Catalysts can improve the quality and yield of the pyrolysis product. Different catalysts have been used in the catalytic pyrolysis of plastic wastes, including Ni, NiO, Ni/Mo/MgO, zeolites, Fe$_2$O$_3$, and Ca(OH)$_2$. The catalyst's effect on polymer waste pyrolysis depends on the catalyst composition, electronic structure, catalyst surface area, porosity, and pH. A variety of efforts have been made in an effort to improve plastic pyrolysis and/or catalysis. WO 2011/132036 A1 by Magalhaes et al. (Magalhaes) discloses preparing and using composite catalysts of grapheno-metal oxide, having graphene platelets as supports for metal-oxides catalysts. Magalhaes describes using the grapheno-metal oxide platelets in organic synthesis, solar cells, solar hydrogen production, and the synthesis of methanol, taking advantage of metal-oxide semi-conductor or catalytic properties. Magalhaes's catalyst nanoparticles may include TiO$_2$, ZnO, ZrO$_2$, Fe$_2$O$_3$, WO$_3$, SrTiO$_3$, BaTiO$_3$, Nb$_2$O$_5$, KTaO$_3$, SnO$_2$, Ta$_2$O$_5$, Al$_2$O$_3$, CeO$_2$, Y$_2$O$_3$, and may be doped with Pt, Pd, Ni, Cu, Fe, Rh, Ru, N, or C. While Magalhaes may exemplify composites of TiO$_2$ with reduced graphene oxide, Magalhaes's manner of making its composites involves solution impregnation, rather than pyrolysis, and the morphology of Magalhaes's composites are not described. Magalhaes does not relate to waste reprocessing or sustainability.

CN 106238104 A by Fan (Fan) discloses a dye wastewater treatment photocatalyst complex and its preparation involving: mixing oxidized graphene, nm-TiO$_2$, and Ti(OBu)$_4$, processing, adding carbon nanotubes, hydrilla varticillata powder, carboxymethylcellulose, chitosan, CuO, Bi$_2$O$_3$, and La(NO$_3$)$_3$, processing further and calcining to obtain a photocatalysis complex that can degrade dyes, decolorize, and serve as a Fenton-type reagent. Fan describes using 1 to 3 or 1.5 to 2.5 parts of graphene oxide (GO) to 2 to 4 or 2.5 to 3.5 parts of TiO$_2$, i.e., a GO:TiO$_2$ weight ratio range of 1:4 to 3:2, though Fan's composition also comprises 1 to 3 or 1.5 to 2.5 parts of Ti(OBu)$_4$. Fan uses a number of additional components for its catalysts, does not describe a morphology with graphene sheets and/or plates, uses at most 94.5 atom. % TiO$_2$ for all Ti present, and at most 75 wt % elemental carbon and Ti compounds relative to all components of Fan's catalyst.

CN 106076378 A by Li et al. (Li) discloses a preparation method and application of a titanium dioxide-graphene oxide-active carbon composite (TiO$_2$-GO-AC) as a photocatalyst. Li's composite has a TiO$_2$-GO-AC component weight ratio of 5:20:4 and is made using graphite and a hydrothermal synthetic method, heating around 180° C. for 12 hours. Li discloses neither the GO structure, nor the TiO$_2$ structure in its composite, nor the presence of carbon dots.

CN 105268436 B by Jiang et al. (Jiang) discloses a photocatalytic material, comprising core-shell composite particles of graphite oxide/graphene oxide shell polymer pyrolysis products, and a nano-titanium dioxide composite sol. Jiang's material can be used in photocatalytic degradation, e.g., of methylene blue. Jiang's material is doped with Li, Mg, Ni, Ag, Zn, Al, or B, and Jiang's outer shell is a pyrolysis product of a polymer or resin. Jiang does not disclose plates or sheets of carbonaceous material, e.g., reduce graphene oxide.

CN 108906037 A by Lu et al. (Lu) discloses a GOQD-$TiO_2$-Ag photocatalyst and its application with wastewater. Lu's material has a $TiO_2$ nanosheet carrier, Ag distributed on the $TiO_2$ nanosheet, and graphene oxide quantum dots (GOQD) are uniformly distributed around the $TiO_2$ nanosheet, prepared hydrothermally. Lu's material contains 6 to 7 parts of Ti to 1 to 2 parts of C, and 1 to 2 parts of Ag, by weight, and Lu's material does not contain graphene oxide plates or sheets, reduced or otherwise.

US 2015/0069295 A1 by Ho et al. (Ho) discloses a hydrogel composition for photocatalytic hydrogen production and storage. Ho's material contains graphene, a $TiO_2$ nanotube array, and carbon quantum dots in a 3D porous and continuous cross-linked structure. Ho's material contains reduced graphite oxide and reduced graphene sheets, but Ho uses 2 parts of graphene to 30 parts of $TiO_2$ by weight and a modified Hummers method to make its material.

CN 107626296 A by Chen et al. (Chen) discloses an oxide quantum dot modified graphene-titanium oxide photocatalysis material which can widen the spectrum response range and the photocatalytic activity of Chen's catalysis material. Chen uses 0.05 to 0.1 g of graphene to 8 to 10 mL $Ti(OBu)_4$, i.e., 0.02 to 0.03 mol Ti, equivalent to 2.1 to 5.1 wt.% graphene oxide in a $TiO_2$ and graphene oxide composite. Moreover, Chen's composite comprises a metal oxide including $MoO_3$, $MnO_2$, $SnO_2$, and/or $WO_3$.

IN 201611016081 by Sahoo et al. (Sahoo) discloses manufacturing graphene, and a self-sustained recycle system thereof, involving pyrolyzing a feedstock of waste plastic and a catalyst at a temperature in a range from ~400 to 1000° C. to yield a pyrolized product; treating the pyrolized product with an acid to obtain graphene and a mixture of gases and lower hydrocarbon; and channeling the mixture of gases and lower hydrocarbon to a catalytic chamber unit to generate a mixture of fuels. Sahoo does not disclose $TiO_2$, but instead montmorillonite, Kaoline, illites, ZSM-5 and some other nanoclays for its catalyst.

Appl. Catal. B: Environ. 2017, 202, 33-42 by Zeng et al. (Zeng) discloses graphene as a catalyst support for improved charge separation in $TiO_2$ photocatalysis and highly dispersed $TiO_2$ and carbon dots (C-dots) co-decorated reduced graphene oxide (CTR) synthesized via a hydrothermal reaction of $TiCl_4$ and glucose. Zeng's C-dots were sourced from the carbonization of glucose. Zeng reports improved superoxide anion ($\cdot O_2^-$) and hydrogen peroxide ($H_2O_2$) generation, as well as charge separation in CTR photocatalysis. Zeng's $TiO_2$ nanocrystals are in anatase form, and Zeng's theoretical wt. % of $TiO_2$ is around 55 wt %, relative to carbon and Ti compounds. Moreover, Zeng uses a hydrothermal method and only heats to 120° C. for 12 hours, rather than pyrolyzing its material.

Chemosphere 2018, 191, 738-746 by Park et al. (Park) discloses a reduced graphene oxide (RGO)/anatase $TiO_2$ composite was prepared using a simple one-step technique—ultrasonic spray pyrolysis—in order to inhibit the aggregation of $TiO_2$ nanoparticles and to improve the photocatalytic performance for degradation of methylene blue (MB). Park uses only 0 or 5 wt. % RGO in its composites, and Park's $TiO_2$ nanoparticles are distributed uniformly on the RGO sheets with crumpled shape, rather than agglomerated and/or on a reduced graphene oxide sheet or plate.

Catalysts 2017, 7(4), 100, 1-33 by Truppi et al. (Truppi) discloses photocatalytic nanomaterials such as $TiO_2$ able to perform visible-light-driven photocatalytic processes for environmental applications. Truppi's overview discloses little more than general information on known syntheses and formulations, with no particular indication of Ti to graphene content, nor any particular morphology.

Mater. Express 2018, 8(4), 345-352 by Mohamed et al. (Mohamed) discloses $TiO_2$ microspheres-RGO that can photocatalytically degrade methyl orange (MO) under visible light irradiation. Mohamed uses a hydrothermal method in the presence of urea, and Mohamed's composites comprise 1, 2, or 3wt. % GO. Mohamed does not disclose a matrix of reduced graphene oxide comprising dispersed $TiO_2$ particles, nor graphene oxide decorated with carbon dots.

RSC Adv. 2014, 4, 26817-26823 by Feng et al. (Feng) discloses transforming car bumper waste into mesoporous magnetic carbon material in the presence of Fe, Cu, and Co nanoparticles. Feng's carbon nanomaterial is magnetic and can remove dye pollutants from water, e.g., rhodamine B (RhB) and methylene blue (MB) by adsorption. Feng does not disclose $TiO_2$, nor reduced graphene oxide sheets with carbon dots.

In light of the above, a need remains for improved $TiO_2$-graphene sheet materials, particularly for photocatalytically degrading organic compounds, e.g., as water contaminants, such as dyes, pharmaceuticals, etc. in waste waters, and methods of making such materials, particularly from carbon-containing waste, particularly waste plastics, such as vehicle interiors, exteriors, and/or bumpers.

SUMMARY OF THE INVENTION

Aspects of the invention provide compositions, comprising: reduced graphene oxide sheets and/or plates; 10 to 50 wt. %, based on total composition weight, of $TiO_2$ particles dispersed in and/or on the reduced graphene oxide sheets and/or plates, wherein at least a portion of the graphene oxide is decorated with carbon dots, and wherein the $TiO_2$ particles comprise $TiO_2$ in anatase phase. Such compositions or "composites" may be modified in any permutation with feature(s) described herein, particularly the following.

The reduced graphene oxide may be present in an amount of 90 to 50 wt. %, based on the total composition weight.

A fraction of Ti from the $TiO_2$, as a total fraction of all Ti present in the composition, may be at least 95 atom. %. Inventive compositions may have Ti in at least 90 atom. % relative to all metals present in the composition. Average diameters of the $TiO_2$ particles may be in a range of from 15 to 55 nm. The $TiO_2$ particles may be present in the composition in a range of from 15 to 45 wt. %, based on the total composition weight.

The reduced graphene oxide may be at least 75 wt. % of all carbon present in the composition. At least 50 wt % of the total composition weight may be from carbon.

Inventive composition may have a BET surface area in a range of from 50 to 110 $m^2/g$, and/or an average pore volume in a range of from 0.025 to 0.095 $cm^3/g$, and/or an average pore size in a range of from 17 to 18.25 nm.

Aspects of the invention include methods of upcycling vehicle exterior waste, the method comprising: pyrolyzing an organic polymer-comprising vehicle exterior material and $TiO_2$ particles in an inert atmosphere at a temperature in the range of 500 to 900° C., to thereby obtain a composite comprising reduced graphene oxide, 10 to 50 wt. %, based on total composite weight, of $TiO_2$, and carbon dots on the reduced graphene oxide. The reduced graphene oxide may be in the form of sheets and/or plates. The vehicle exterior material may be car bumper material. The vehicle exterior material may comprise styrenic polymer and/or olefinic polymer.

Aspects of the invention comprise methods of making any permutation of the inventive composition described herein. Such methods may comprise: pyrolyzing a mixture comprising $TiO_2$ particles and fragments of car bumpers in an inert atmosphere at a temperature in the range of 500 to 900° C.; and cooling, to obtain the inventive composition.

Aspects of the invention comprise methods of decomposing one or more organic materials, the method comprising: mixing or contacting any permutation of the inventive composition described herein with an aqueous solution comprising an organic material, to form a mixture or a contact surface, and irradiating the mixture or the contact surface with sunlight and/or synthetic light in a wavelength range of from 100 to 1000 nm. The composite may comprise the $TiO_2$ particles in a range of from 15 to 45 wt. %. The organic material may include a dye, a pharmaceutical, or a surfactant.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9B shows a plot of the photocatalytic degradation of 20 ppm of MB as the variation of $C/C_0$ with irradiation time in the presence of different photocatalysts described herein, P25, $TiO_2$, PS700, PST0.5, and PST1;

DETAILED DESCRIPTION OF THE PREFERRED EMBODIMENTS

Figure 1:
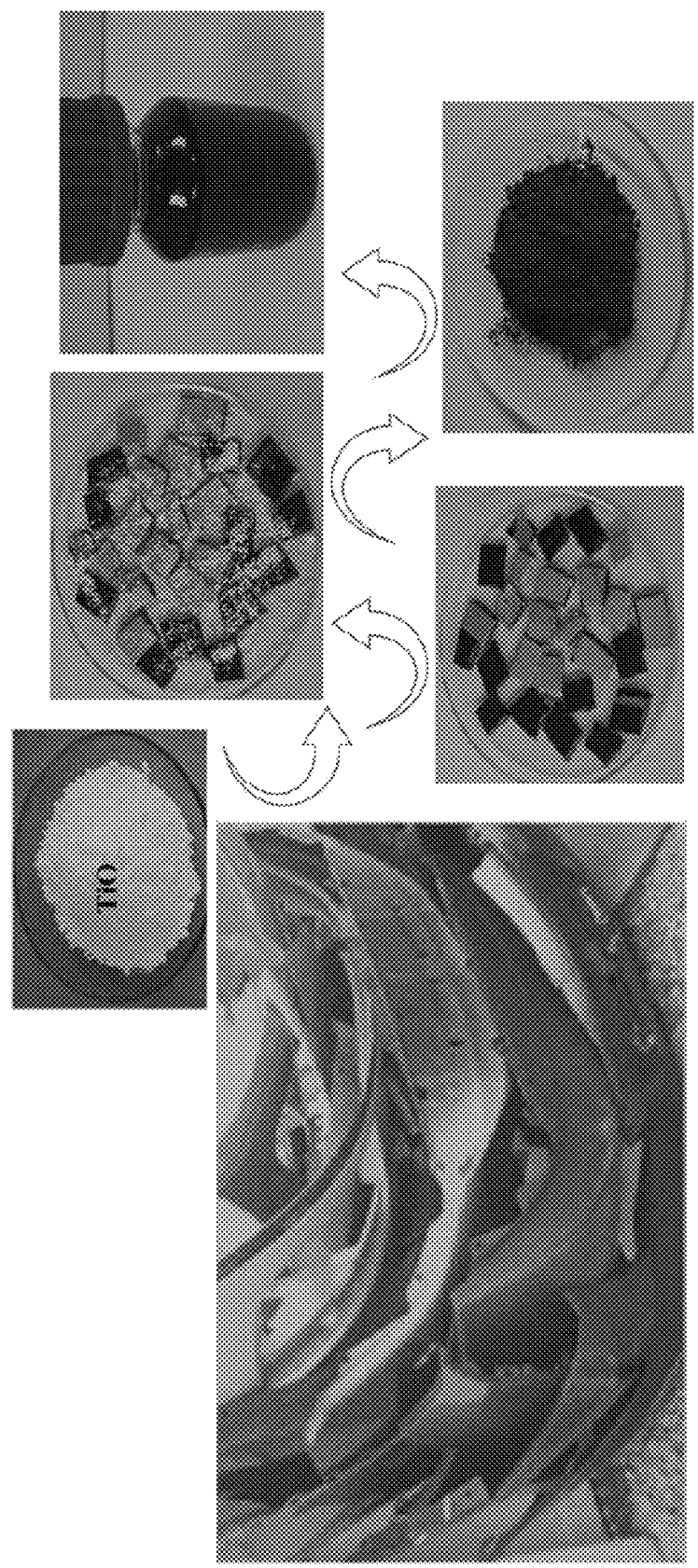
FIG. 1 shows a schematic representation of a catalytic transformation of car bumper waste to carbon based nanomaterials within the scope of the invention.

Aspects of the invention provide compositions, comprising: waste plastics such as car bumper; 10 to 50 wt. %, e.g., any of these endpoints and/or at least 12.5, 15, 17.5, 20, 22.5, 25, 27.5, or 30 wt. % and/or up to 55, 52.5, 47.5, 45, 42.5, 40, 37.5, 35, 32.5, or 30 wt.%, based on total composition weight, of $TiO_2$ particles dispersed in and/or on the waste plastics such as car bumper, wherein at least a portion of the reduced graphene oxide is decorated with carbon dots, and wherein the $TiO_2$ particles comprise $TiO_2$ in anatase phase. Generally, the $TiO_2$ may be at least 50, 65, 75, 80, 82.5, 85, 86, 87, 88, 89, or 90% and/or up to 100, 97.5, 95, 92.5, 90, 89, 88, 87, 86, 85, 80, 75, or 70%, anatase phase $TiO_2$.

The (elemental) carbon in the compositions may be in the form of graphene sheets and/or plates in at least 50, 60, 70, 75, 80, 85, 90, 95, 97.5, 98, 99, or 99.5 wt. % and/or up to 100, 97.5, 95, 92.5, 90, 85, 80, 75, 70, or 65 wt. %, of the total elemental carbon weight. The average density of the $TiO_2$ in inventive compositions may be in a range of from 3.80 to 3.90, 3.81 to 3.88, 3.82 to 3.86, or 3.83 to 3.85 g/cm$^3$, e.g., any of these endpoints and/or at least 3.805, 3.815, 3.825, 3.835, or 3.84 g/cm$^3$ and/or up to 3.89, 3.875, 3.87, 3.865, or 3.855 g/cm$^3$. The reduced graphene oxide and/or the amount of elemental carbon in the composition may be present in an amount of 90 to 50 wt. %, e.g., any of these endpoints and/or at least 55, 60, 65, 70, 75, 80, or 85 wt. % and/or up to 87.5, 82.5, 77.5, 72.5, 70, 67.5, 65, 62.5, or 60 wt. %, based on the total composition weight. The ratio of elemental carbon in the form of reduced graphene oxide versus other forms of carbonaceous matter in inventive compositions may be at least 75, 80, 85, 90, 92.5, 95, 97.5, 98, 99, 99.1, 99.5, or 99.9 wt. % of the total elemental carbon in the composition. The meaning of "plate" or "sheet" as used herein generally means a planar-shaped form, wherein the length and/or width dimensions are (independently) at least 2, 3, 4, 5, 10, 15, or 20-fold the height (or thickness) dimension, and/or generally not in rod, cubic, and/or spherical-shaped form.

A fraction of Ti from the $TiO_2$, as a total fraction of all Ti present in the composition, may be at least 95 atom. %, e.g., at least 96, 97, 97.5, 98, 99, 99.1, 99.5, or 99.9 atom. % Ti from $TiO_2$ relative to total Ti present in the composition. Inventive compositions may have Ti in at least 90, 90, 91, 92, 92.5, 93, 94, 95, 96, 97, 97.5, 98, 99, 99.1, 99.5, or 99.9 atom. % relative to all metals present in the composition. Average diameters of the $TiO_2$ particles may be in a range of from 15 to 55 nm, e.g., any of these endpoints and/or at least 17.5, 20, 22.5, 25, 27.5, or 30 nm and/or up to 52.5, 50, 47.5, 45, 42.5, 40, 37.5, 35, 32.5, or 30 nm. The distribution of $TiO_2$ size may be monomodal, though certain applications may use bimodal, trimodal, or multimodal $TiO_2$ particle size distributions. The $TiO_2$ particles may be present in the composition in a range of from 15 to 45 wt. %, e.g., any of these endpoints and/or at least 17.5, 20, 22.5, 25, 27.5, or 30 wt. % and/or up to 42.5, 40, 37.5, 35, 32.5, 30, 27.5, 25, or 22.5 wt. %, based on the total composition weight. The $TiO_2$ particles may be agglomerated into 5, 4, 3, 2.5, 2, 1.5, 1.25, 1, or 0.75 µm-long and/or 2.5, 2.25, 2, 1.75, 1.5, 1.25, 1, 0.75, or 0.5 gm-wide $TiO_2$ agglomerates.

Carbon dots upon and/or embedded within the reduced graphene oxide sheets and/or plates may be spaced irregularly and/or at least partially regularly, and may have spacings of, e.g., 10, 20, 30, 40, 50, 60, 70, 80, 90, and/or 100 nm, and/or the carbon dots overlap (within or upon a single graphene sheet/plate) less than 25, 20, 15, 10, 5, 2.5, 1, or 0.1% of the occurrences of carbon dots. Inventive compositions may have a weight percentage of carbon components relative to $TiO_2$ and/or all metal/metal oxide components of above 7.5, 10, 15, 20, 25, 30, 35, 40, 45, 50, 55, 60, or 65 wt. %.

The reduced graphene oxide may be at least 75, 85, 90, 92.5, 95, or 97.5 wt. % of all carbon present in the composition. At least 50, 55, 60, 62.5, 65, 67.5, 70, 72.5, 75, 77.5, 80, 82.5, 85, 87.5, 90, or 95 wt. % of the total composition weight may be from carbon, and/or up to 92.5, 90, 88, 86, 84, 82, 81, 80, 79, 78, 77, 76, 75, 74, 73, 72, 71, or 70 wt. %.

Inventive compositions may have a BET surface area in a range of from 50 to 110 $m^2/g$, e.g., any of these endpoints and/or at least 52.5, 55, 57.5, 60, 62.5, 65, 67.5, 70, 72.5, 75, 77.5, or 80 $m^2/g$ and/or up to 105, 100, 95, 92.5, 90, 87.5, 85, 82.5, 80, 77.5, 75, 72.5, or 70 $m^2/g$. Inventive compositions may have an average pore volume in a range of from 0.025 to 0.095 $cm^3/g$, e.g., any of these endpoints and/or at least 0.03, 0.035, 0.034, 0.0345, 0.035, 0.0355, 0.036, 0.0365, 0.037, 0.0375, 0.038, 0.0385, 0.039, 0.04, 0.0405, 0.041, 0.0415, 0.042, 0.0425, 0.043, 0.0435, 0.044, 0.0445, or 0.045 $cm^3/g$ and/or up to 0.09, 0.0875, 0.085, 0.0825, 0.08, 0.0775, 0.075, 0.0725, 0.07, 0.0675, 0.065, 0.0625, 0.06, 0.0575, 0.055, 0.0525, 0.05, 0.0475, 0.045, 0.0425, or 0.04 $cm^3/g$. Inventive compositions may have an average pore size in a range of from 17 to 18.25 nm, e.g., either of these endpoints and/or at least 17.125, 17.25, 17.375, 17.5, 17.625, 17.75, 17.875, or 18 nm and/or up to 18.125, 18, 17.875, 17.75, 17.625, or 17.75 nm.

Aspects of the invention include methods of upcycling vehicle exterior waste, the method comprising: pyrolyzing an organic polymer-comprising waste material, e.g., a vehicle exterior material, and $TiO_2$ particles in an inert atmosphere at a temperature in the range of 500 ° C. to 900° C., e.g., either of these endpoints and/or at least 525, 550, 575, 600, 625, 650, 675, 700, 725, 750, 775, or 800° C. and/or up to 875, 850, 825, 800, 775, 750, 725, 700, or 675° C., to thereby obtain a composite comprising reduced graphene oxide, 10 to 50 wt. %, based on total composite weight, of $TiO_2$, and carbon dots on the reduced graphene oxide. The $TiO_2$, reduced graphene oxide, and/or carbon dots may be in any manifestation, morphology, and/or percentage described above for inventive compositions. For example, the reduced graphene oxide may be in the form of sheets and/or plates. The vehicle material, preferably a vehicle exterior material, may be car bumper material, or any other car, truck, tractor, trailer, camper, RV, boat, ship, yacht, tanker, etc., part, which contains organic polymer material and may otherwise be land-filled, dumped into seas or oceans, or combusted. The vehicle exterior material may comprise styrenic polymer, such as polystyrene, polymerized substituted styrene(s), ABS, SAN, and/or other co- or ter-polymers of styrene, etc., and/or olefinic polymer, such as polyethylene (PE), polypropylene (PP), polymethylpentene (PMP), polybutene-1 (PB-1), polyolefin elastomers (POE): polyisobutylene (PIB), ethylene propylene rubber (EPR), ethylene propylene diene monomer (M-class) rubber (EPDM rubber), etc. The polymers may be in the form foams, sheets, hoses, elastomers, or mixtures of these. The material of the vehicle may be a filled plastic, e.g., with carbon black, impact strengtheners, glass fiber, carbon fibers, fiberglass, pigments/dyes, etc., though it may be preferable to avoid substantial amounts of non-carbon-based additives and/or fillers.

The material of car bumpers useful in the invention may vary by model, but generally includes thermoplastic polyolefins (TPO), such as polypropylene (PP), ethylene propylene diene (EPD), acrylontrile butadiene styrene (ABS), polycarbonate-ABS (PC/ABS), polybutylene terephthalate (PBT), polyurethane (PU or PUR), including reaction injection molded polyurethane (RIM-PU or RIM-PUR) and thermoplastic polyurethane (TPU or TPUR), ethylene methacrylic acid (EMA), polystyrenes, and/or polyamides.

Aspects of the invention comprise methods of making any permutation of the inventive composition described herein. Such methods may comprise: pyrolyzing a mixture comprising $TiO_2$ particles and fragments of car bumpers in an inert atmosphere at a temperature in the range of 500 to 900° C.; and cooling, to obtain the inventive composition. The temperature range, $TiO_2$, reduced graphene oxide, and/or carbon dots may be in any manifestation, morphology, and/or percentage described above for inventive compositions. Pyrolyses as described anywhere herein may be conducted for at least 0.5, 0.75, 1, 1.5, 2, or 2.5 hours and/or up to 10, 8, 6, 5, 4, 3, or 2 hours. Generally, the duration of pyrolysis will be guided by the achievement of desired product characteristics. Upcycling and/or manufacturing methods described herein may include a hydrothermal treatment, e.g., in a closed vessel at 100 to 140, 110 to 130, 115 to 125, or 120° C. for 10 to 20, 12 to 18, 14 to 16, or 15 hours, followed by a pyrolysis, though the hydrothermal treatment may be used, for example, exclusively for the synthesis of $TiO_2$ particles or for further components, as desired. The $TiO_2$ particles may be obtained commercially or from a process as described herein. Inventive methods may avoid using the Hummers method of synthesizing graphene entirely. Inventive aspects may also include converting the morphology of $TiO_2$ from (largely, e.g., 75, 80, 85% or more) rutile to (largely, e.g., 75, 80, 85% or more) anatase.

Aspects of the invention comprise methods of decomposing one or more organic materials, the method comprising: mixing or contacting any permutation of the inventive composition described herein with an aqueous solution comprising an organic material, to form a mixture or a contact surface, and irradiating the mixture with sunlight and/or synthetic light in a wavelength range of from 100 to 1000 nm. The composite may comprise the $TiO_2$ particles in a range of from 15 to 45 wt. % or any other range described herein. The organic material may include a dye (organic dye, pigment, and/or other type of colorant), a pharmaceutical (any substantially organic medicine in waste water), or a surfactant (soap, detergent, shampoo, etc.). Any organic compound may be subject to degradation by such a method. The contacting may involve packing any inventive composition described herein into a filter, or cartridge for filtering, then flowing a liquid or gas containing organic contaminant through the filter.

The irradiation may use sunlight and/or an artificial light (e.g., from a lamp), including broad wavelength UV and/or visible light, e.g., from 10 to 1000 nm, or fractions thereof, such as ranges including endpoints selected from 100±5, 10, 20, 25, 30, 40, or 50, 200±5, 10, 20, 25, 30, 40, or 50, 300±5, 10, 20, 25, 30, 40, or 50, 400±5, 10, 20, 25, 30, 40, or 50, 500±5, 10, 20, 25, 30, 40, or 50, 600±5, 10, 20, 25, 30, 40, or 50, 700±5, 10, 20, 25, 30, 40, or 50, 800±5, 10, 20, 25, 30, 40, or 50, or 900±5, 10, 20, 25, 30, 40, or 50 nm. Further examples of irradiation wavelengths may be 254 and/or 365 nm. The contacting may reduce a concentration of the organic compound by at least 60, 65, 70, 75, 80, 85, 90, or 95% within 30 minutes. Such reductions may be achieved, for example, within 60, 50, 45, 40, 35, 30, 25, 20, or 15 minutes, depending upon the compound in question.

Organic compounds subject to degradation by inventive composites and/or methods described herein may include pharmaceuticals, dyes, soaps, oils, and adhesives, e.g., fluorescent and/or phosphorescent compounds, chromophores and/or colorless compounds. The organic compound may comprise a dye, including acid dyes, basic dyes, direct dyes, reactive dyes, mordant dyes, etc., such as one or moreazo dyes, acridine dyes, anthraquinone dyes, arylmethane dyes, diarylmethane dyes, triarylmethane dyes, phthalocyanine dyes, quinone-imine dyes, azin dyes, eurhodine dyes, safranine dyes, indamines, indophenol dyes, oxazine dyes, oxazone dyes, thiazine dyes, thiazole dyes, xanthene dyes, fluorene dyes, pyronine dyes, fluorone dyes, rhodamine dyes, or mixtures of these.

Inventive composites may exclude, include only trace amounts of, or may generally contain less than 15, 10, 7.5, 5, 2.5, 2, 1, 0.1, 0.01, 0.001, or 0.0001 wt. %, relative to total composite weight, of Zn and/or Zn compounds/complexes, such as ZnO, Zr and/or Zr compounds/complexes, such as $ZrO_2$, Fe and/or Fe compounds/complexes, such as $Fe_2O_3$, W and/or W compounds/complexes, such as $WO_3$, Sr and/or Sr compounds/complexes, such as $SrTiO_3$, Ba and/or Ba compounds/complexes, such as $BaTiO_3$, Nb and/or Nb compounds/complexes, such as $Nb_2O_5$, Ta and/or Ta compounds/complexes, such as $KTaO_3$ and/or $Ta_2O_5$, B and/or B compounds/complexes, Mo and/or Mo compounds/complexes, such as $MoO_3$, Mn and/or Mn compounds/complexes, such as $MnO_2$, Mg and/or Mg compounds/complexes, Sn and/or Sn compounds/complexes, such as $SnO_2$, Al and/or Al compounds/complexes, such as $Al_2O_3$, Ce and/or Ce compounds/complexes, such as $CeO_2$, Y and/or Y compounds/complexes, such as $Y_2O_3$, carbon nanotubes, Zn and/or Zn compounds/complexes Cu and/or Cu compounds/complexes, such as $Cu(O_2CCH_3)_2$, Bi and/or Bi compounds/complexes, such as $Bi_2O_3$, and/or La and/or La compounds/complexes, such as $La(NO_3)_3$.

Inventive composites may exclude, include only trace amounts of, or may generally contain less than 5, 4, 3, 2.5, 2, 1, 0.5, 0.1, 0.01, 0.001, or 0.0001 wt. %, relative to total composite weight, of cellulose/cellulosic polymers, such as carboxymethylcellulose and/or chitosan.

Inventive composites may be undoped and/or unplated, or contain no more than 5, 4, 3, 2.5, 2, 1.5, 1, 0.5, 0.1, 0.01, 0.001, or 0.0001 wt. %, relative to total composite weight, of Pt, Pd, Ag, Au, Ni, Cu, Fe, Rh, Ru, and/or Inventive composites may contain no more than 5, 4, 3, 2.5, 2, 1.5, 1, 0.5, 0.1, 0.01, 0.001, or 0.0001 wt. %, relative to total composite weight, of rare earth salts, such as $Ce^{3+}$, $La^{3+}$, $Nd^{3+}$, and/or $Eu^{3+}$, and/or $Fe^{3+}$, $Cu^{3+}$, or mixtures thereof Inventive composites may exclude, include only trace amounts of, or may generally contain less than 5, 2.5, 1, 0.5, 0.1, 0.01, 0.001, 0.0001, or 0.00001 wt. %, relative to total composite weight, of a bitumen material, such as coal pitch, petroleum pitch, coal tar pitch, and/or emulsified asphalt, and/or a polymeric resin, such as furan, urea, pyrimidine, phenolic, epoxy, and/or polymethyl methacrylate resins.

Aspects of the invention include transforming polymer waste into value-added carbon-based nanomaterials. Automobile waste, particularly car bumper material(s) may be exploited as a resource for carbon nanomaterials, e.g., using catalytic pyrolysis processes. Titania, i.e., titanium oxide ($TiO_2$) nanoparticles may be used as a pyrolysis catalyst for polymer waste. The quality and performance of the pyrolysis product (carbon nanomaterials) may have a morphology which changes with the presence of $TiO_2$ as a catalyst in pyrolysis process. Porous reduced graphene oxide (RGO) sheets can be produced from the thermal pyrolysis of car bumper waste in the absence of $TiO_2$ catalyst, while reduced graphene oxide (RGO) sheets decorated with carbon dots can be produced from the catalytic pyrolysis of the same material, i.e., car bumper waste, in the presence of $TiO_2$ catalyst. A $TiO_2$ phase transformation from rutile to anatase may occur upon the thermal treatment of $TiO_2$ in presence of the car bumper waste. In addition, the photocatalytic activity of carbon nanocomposites prepared by $TiO_2$ pyrolysis can be used in photocatalytic degradation of organic materials, such as methylene blue dye.

Aspects of the invention include transforming industrial waste particularly vehicle exterior waste, e.g., from car bumpers, into carbon nanomaterials. Aspects of the invention provide introducing $TiO_2$ nanoparticles as a catalyst for the upcycling of such waste, particularly car bumpers, through an economical thermal decomposition to create active carbon-based nanomaterials, such as $TiO_2$-carbon dot (CD)-reduced graphene oxide (RGO). Inventive $TiO_2$-CD-RGO composites produced as described herein can exhibit high photocatalytic activity for the degradation of organic materials, modeled on methylene blue (MB) dye, compared to pure $TiO_2$ under the same conditions. A synergetic effect between $TiO_2$ and the incorporated carbon nanomaterials in ($TiO_2$-CD-RGO) may play a role in enhancing photocatalytic activity of the nanomaterials synthesized as described. The enhancement of the photocatalytic activity of these nanomaterials may also or separately be attributed to the role of CD-RGO in enhancing electron transport, and/or enhancing light harvesting properties, and/or decreasing the electron-hole pair recombination rate. Aspects of the invention provide upcycling of industrial waste, such as vehicle exterior and/or interior parts (e.g., car bumpers, siding, and the like) in a more sustainable manner, and/or useful information for large-scale fabrication of graphene-based carbon nanomaterials at low cost for multipurpose applications.

EXAMPLES

Synthesis of $TiO_2$ nanoparticles: $TiO_2$ nanoparticles were synthesized by hydrolysis of $TiCl_4$ followed by hydrothermal treatment, i.e., synthesis of (single) crystals depending on the solubility of minerals in hot water under high pressure. The crystal growth can be performed in an apparatus such as a steel pressure vessel, i.e., autoclave, in which a nutrient is supplied along with water. A temperature gradient can be maintained between the opposite ends of the growth chamber. At the hotter end the nutrient solute dissolves, while at the cooler end it is deposited on a seed crystal, growing the desired crystal. In a typical synthesis, 10 mL (17.3 g, 0.091 mol) of pre chilled $TiCl_4$ was slowly added to 250 mL of distilled water under ice bath with vigorous stirring to obtain a suspension. After that, 5 g (0.083 mol) of urea was dissolved in the resulting suspension and then allowed to stir for 1 hour further, resulting in a second suspension. The second suspension was transferred to 500 mL Teflon-lined autoclave and heated in the air oven at 120° C. for 15 hours. After the hydrothermal treatment a white precipitate was obtained. The product was collected and washed with deionized water several times by centrifugation and then dried at 70° C. for 2 hours.

CATALYTIC TRANSFORMATION OF CAR BUMPER WASTE TO CARBON-BASED NANOMATERIALS: Car bumper waste was transformed to carbon-based nanomaterials by catalytic thermal decomposition. In a typical method, a piece of car bumper waste was first cut into small pieces, e.g., at least 0.1, 0.2, 0.25, 0.3, 0.4, 0.5, 0.6, 0.75, 0.8, 0.9, 1, 1.25, 1.5, 1.75, 2, 4, 6.25, or 9 cm$^2$ and/or up to 25, 16, 9, 6.25, 4, 3.5, 3, 2.5, 2, 1.9, 1.8, 1.7, 1.6, 1.5, 1.4, 1.3, 1.25, 1.2, 1.1, or 1 cm$^2$, and then washed with distilled water and dried in air. 10 g of the bumper pieces was transferred to Pyrex dish and placed in stainless steel container. A desired amount of the $TiO_2$ nanoparticles (0.5 g-0.00626 mol, or 1 g-0.0125 mol), synthesized as described above, was added to the bumper pieces in the Pyrex dish. After that, the container was tightly closed, transferred into muffle furnace, and heated at 700° C. for 1 hour to afford shiny black powder. For comparison, the car bumper waste was also thermally degraded in absence of $TiO_2$ nanoparticles, but otherwise identical conditions. The samples thermally treated at 700° C. were designated as PS700 (no $TiO_2$), PST0.5 (0.5 g $TiO_2$), and PST1 (1 g $TiO_2$). Images from a representative catalytic transformation of car bumper waste to carbon-based nanomaterials are shown in FIG. 1. The mass balance for the catalytic pyrolysis of car bumper waste at different concentration of $TiO_2$ nanoparticles at 700° C. is provided in Table 1.

TABLE 1

Mass balance for the catalytic pyrolysis of waste car bumpers at different $TiO_2$ nanoparticles concentrations at 700° C.

| Sample Name | Input Mass (g) | Output Mass (g) | Pyrolysis Yield of Carbon Nanomaterials (wt. %) | Ti in Product (wt. %) |
|---|---|---|---|---|
| PS 700 | $TiO_2$: 0 g, Car Bumper: 10 g | 1.19 | 11.9 | 0 |
| PST 0.5 | $TiO_2$: 0.5 g, Car Bumper: 10 g | 1.76 | 12.6 | 28.4 |
| PST 1 | $TiO_2$: 1 g, Car Bumper: 10 g | 2.34 | 18.4 | 42.7 |

CHARACTERIZATION: Different characterization techniques were used to evaluate the quality, performance and physical properties of the materials, including x-ray diffraction (XRD) spectroscopy, scanning electron microscopy (SEM), transmission electron microscopy (TEM), Raman spectroscopy, thermogravimetric analysis (TGA), and Brunauer-Emmett-Teller (BET) surface area measurements. Characterization measurements were performed for raw car bumper before thermal treatment (PS0), the as $TiO_2$ nanoparticles prepared as discussed above ($TiO_2$), the $TiO_2$ nanoparticles after thermal treatment at 700° C. ($TiO_2$ 700), the car bumper material after thermal treatment in the absence of $TiO_2$ (PS700), the car bumper material after thermal treatment in the presence of 0.5 g of $TiO_2$ (PST0.5), and the car bumper material after thermal treatment in the presence of 1 g of $TiO_2$ (PST1).

The washed and dried raw car bumper pieces were grinded to fine particles for different characterization. X-ray diffraction (XRD) measurements were performed using a Shimadzu-XRD Powder diffractometer (xrd-700, Maxima) with a Cu radiation source, at a scanning speed of 2°/min, 40 kV tube voltage, and 30 mA tube current, with a scanning range of 5 to 90°. A FEI, ISPECT S50 scanning electron microscope (SEM, Czech Republic) was used to examine the specimens. The SEM parameters included an acceleration voltage of 20 kV, a working distance of ca. 10 mm, and a spot size of 3. The powder specimens were mounted onto a metallic slab with a double-sided adhesive tape. Images were captured at different magnifications. For transmission electron microscopy (TEM), the powder was dispersed in ethanol, sonicated for 5 minutes, and deposited onto a TEM grid having a carbon support film. The grids were dried before mounting the into the TEM. An FEI, Morgagni TEM (Czech Republic) was used at 80 kV to record the images. The thermal decomposition of the materials was recorded with a Shimadzu DTG-60H DTA-TGA thermal analyzer in the temperature range 25 to 1000° C. The specific surface area and pore diameter of the samples were measured by $N_2$ adsorption isotherm using the BET method on the sample with a Quantachrome NOVA 1200e analyzer at 77 k. Raman spectra were obtained using a Thermo Scientific Raman spectroscope having a 532-nm laser as an excitation source. The thermal treatment of the samples was performed using Barnstead Thermolyne 6000 Muffle Furnace, burning at 700° C. in an air atmosphere.

PHOTOCATALYTIC ACTIVITY: The photocatalytic performance of the carbon nanomaterials produced from the exemplary thermal treatments of car bumper waste in the absence or presence of $TiO_2$ nanoparticles was determined by measuring the degradation of methylene blue dye (MB) as a model pollutant. The photocatalytic experiments were carried out in a 250 mL column glass reactor irradiated from the top with UV lamp (254 nm, 16 W). The photoreactor was open to the atmosphere from the top. In all photocatalysis experiments, an amount of 1 g/L of the respective catalyst, i.e., PS700, PST0.5, PST1, and pure $TiO_2$, was homogeneously dispersed in 50 mL of ultra-high pure water. After that, 50 mL of 100 mg/L of an aqueous dye solution was added to the previous suspension. Degussa P25 $TiO_2$ was used as a benchmark for the photocatalytic degradation of MB under the same experimental conditions. All experiments have been carried out at the natural pH of 6.6. Prior to the photocatalysis, the suspensions containing the catalyst and the dye were magnetically stirred in the dark for 30 minutes to establish adsorption-desorption equilibrium. The irradiation was performed under magnetic stirring at room temperature. Sample aliquots (5 mL) were taken at the desired time and then filtered to separate the solid catalyst. The degradation efficiency of the samples was defined in terms of the $C/C_0$ ratio, where $C_0$ is the initial dye concentration at $t_0$ and C is the final dye concentration at t.

Figure 2:
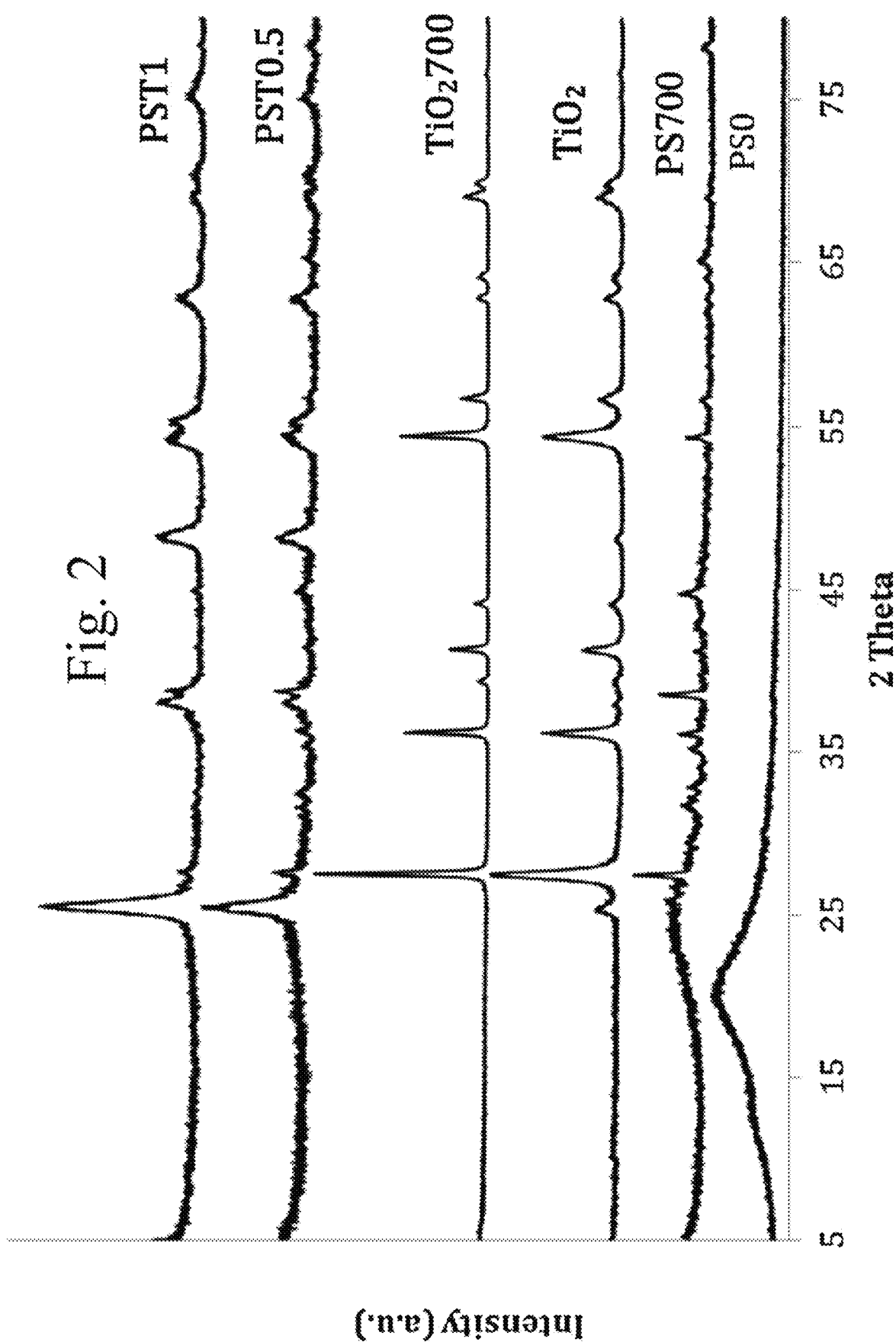
FIG. 2 shows XRD patterns of raw, untreated car bumper waste material, PS0, car bumper waste material after thermal treatment at 700° C., PS700, untreated $TiO_2$ prepared as described herein, $TiO_2$, $TiO_2$ after thermal treatment at 700° C., $TiO_2$ 700, car bumper waste material after pyrolysis 700° C. in the presence of 0.5 g $TiO_2$, PST0.5, and car bumper waste material after pyrolysis 700° C. in the presence of 1 g $TiO_2$, PST1.
Figure 3:
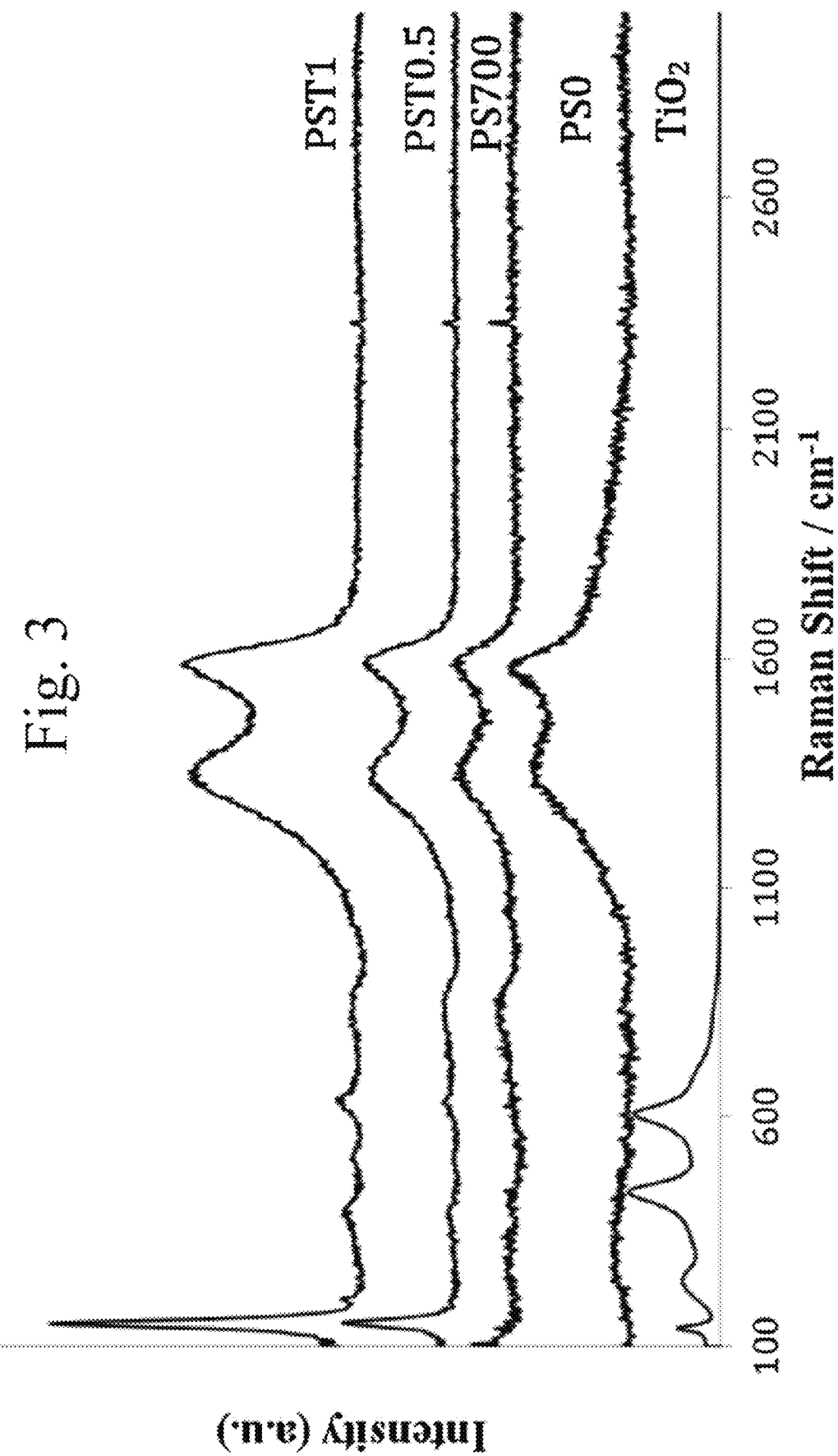
FIG. 3 shows Raman spectra of PS0, PS700, $TiO_2$, PS700, PST0.5, and PST1.
Figure 6:
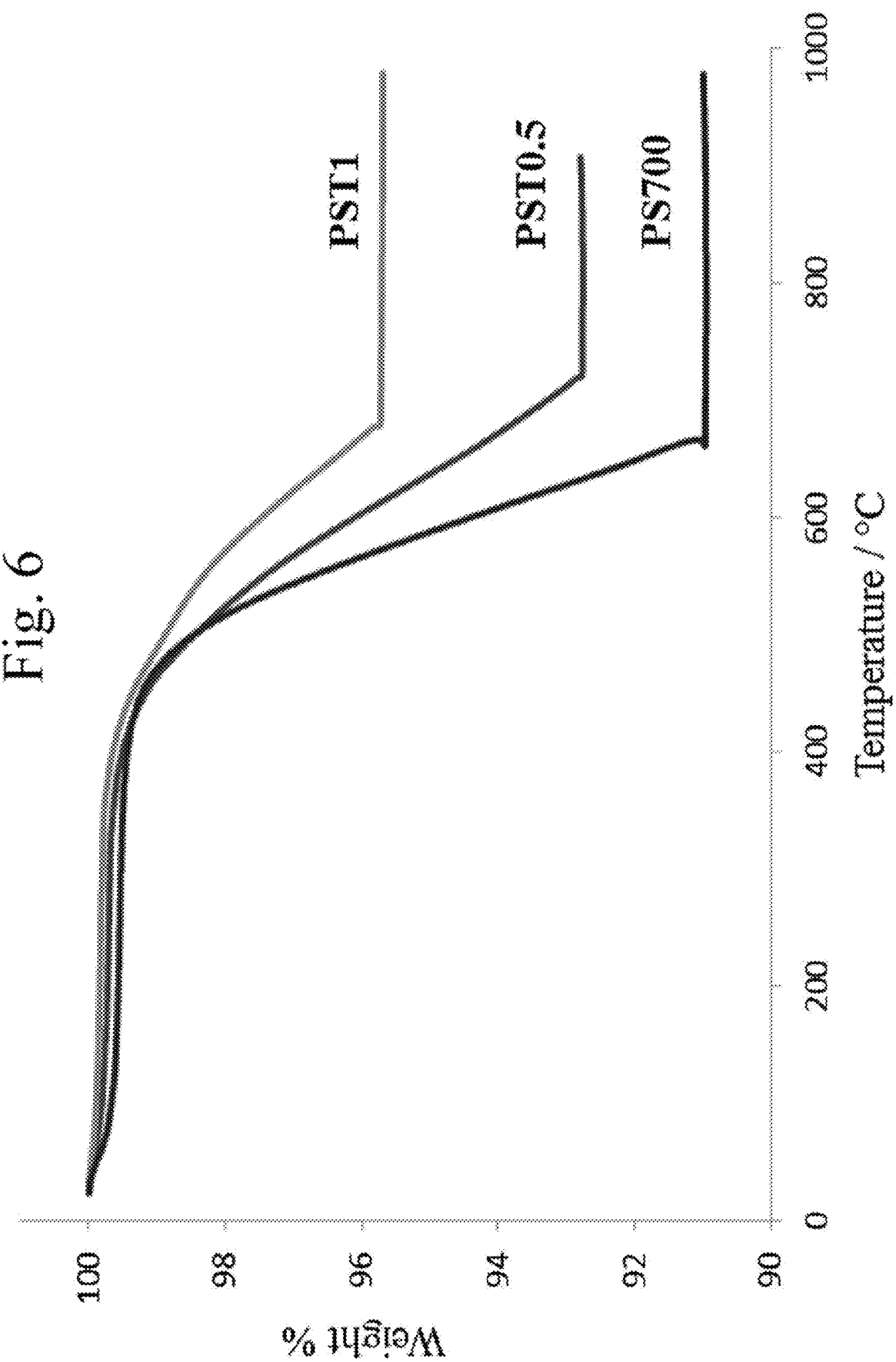
FIG. 6 shows a thermogravimetric analytical (TGA) plot of car bumper waste after 700° C. thermal treatment in absence of $TiO_2$ nanoparticles (PS700), in the presence of 0.5 g $TiO_2$ (PST0.5), and in the presence of 1 g $TiO_2$ (PST1)
Figure 7:
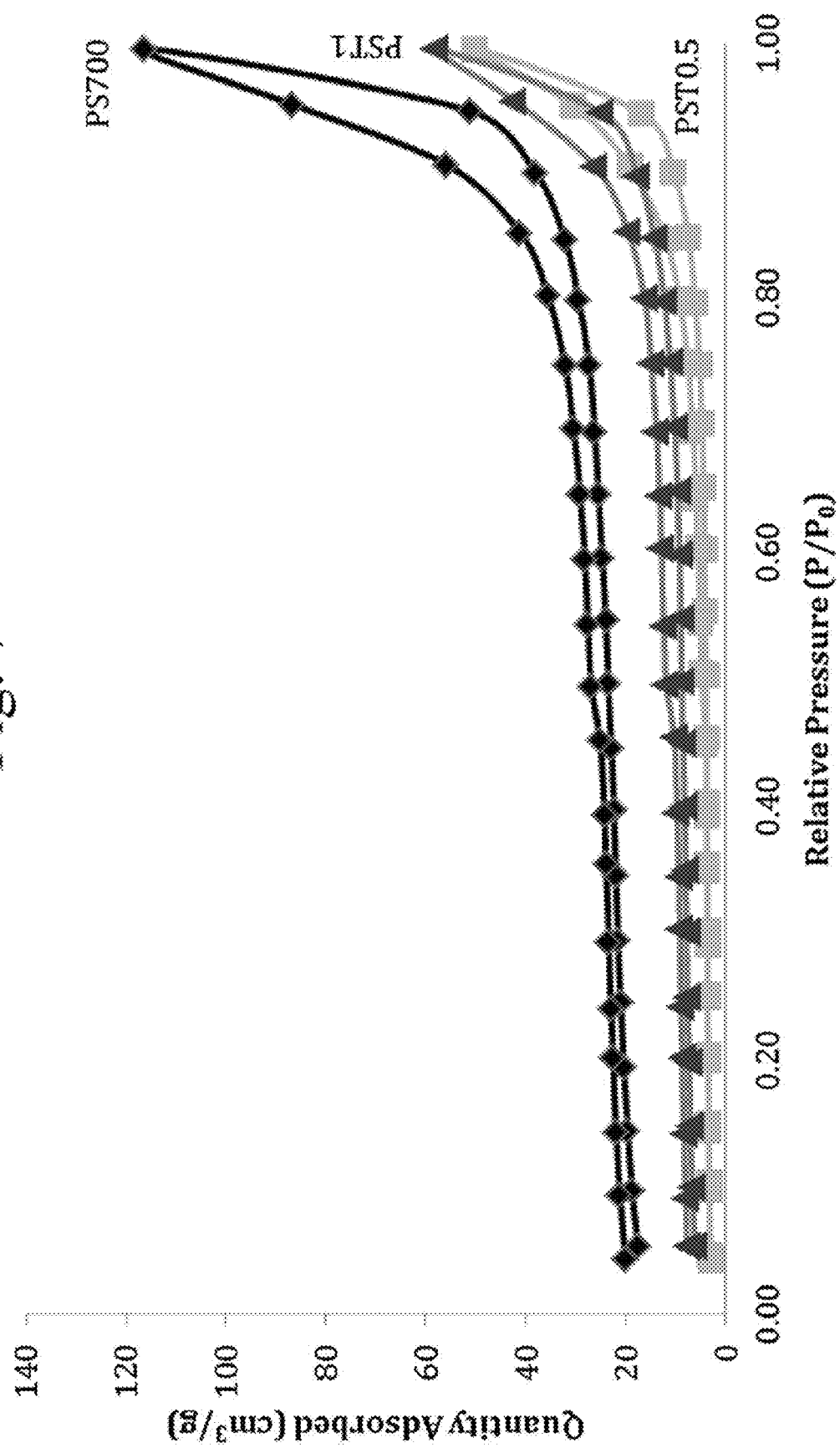
FIG. 7 shows $N_2$ adsorption desorption isotherms of car bumper waste after 700° C. thermal treatment in absence of $TiO_2$ nanoparticles (PS700), in the presence of 0.5 g $TiO_2$ (PST0.5), and in the presence of 1 g $TiO_2$ (PST1)

CHARACTERIZATION: FIG. 2 shows the XRD patterns of the raw car bumper before thermal treatment, PS0, the $TiO_2$ nanoparticles prepared as described herein, $TIO_2$, the car bumper material after thermal treatment at 700° C. in the absence of $TiO_2$, PS700, the car bumper material after pyrolysis at 700° C. in the presence of 0.5 g of $TiO_2$, PST0.5, and the car bumper material after pyrolysis at 700° C. in the presence of 1 g of $TiO_2$, PST1. The XRD results are discussed below. FIG. 3 shows the Raman spectra of the raw car bumper before thermal treatment, PS0, the $TiO_2$ nanoparticles prepared as described herein, $TIO_2$, the $TiO_2$ nanoparticles after thermal treatment at 700° C., $TiO_2$ 700, the car bumper material after pyrolysis at 700° C. in the presence of 0.5 g of $TiO_2$, PST0.5, and the car bumper material after pyrolysis at 700° C. in the presence of 1 g of $TiO_2$, PST1. The Raman spectra are discussed below. FIGS. 4 and 5 respectively show the SEM and TEM images of car bumper material after thermal treatment in the absence or presence of $TiO_2$ as discussed below. FIG. 6 shows the thermal gravimetric analysis (TGA) of PS700, PST0.5, and PST1. FIG. 7 shows $N_2$ adsorption desorption and surface area measurements of the car bumper material after thermal treatment at 700° C. in the absence or presence of $TiO_2$ (PS700, PST0.5, and PST1). The $N_2$ adsorption characteristic values of all samples measured are given below in Table 2.

TABLE 2

$N_2$ adsorption-desorption characteristics of PS700, PST0.5, and PST1.

| Sample Name | $S_{BET}$ ($m^2/g$) | Pore Volume ($cm^3/g$) | Average Pore Size (nm) |
|---|---|---|---|
| PS 700 | 120.3 | 0.125 | 18.56 |
| PST 0.5 | 96.2 | 0.062 | 17.66 |
| PST 1 | 57.88 | 0.044 | 17.32 |

Figure 8:
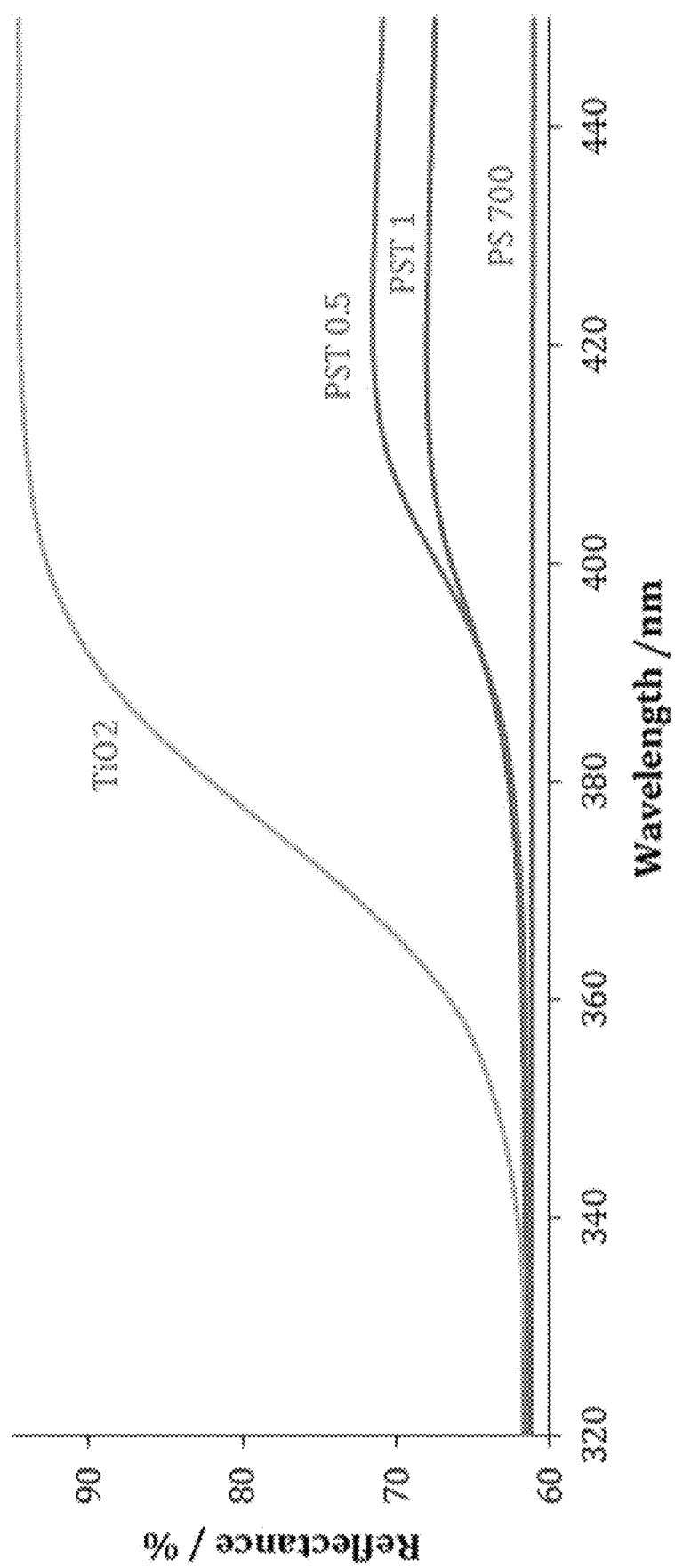
FIG. 8 shows UV-vis spectra of pure $TiO_2$, $TiO_2$, car bumper waste after 700° C. thermal treatment in absence of $TiO_2$ nanoparticles (PS700), in the presence of 0.5 g $TiO_2$ $_{(PST}$0.5), and in the presence of 1 g $TiO_2$ (PST1)

FIG. 8 shows UV-vis diffuse reflectance measurements of the samples, as discussed below.

Figure 9A:
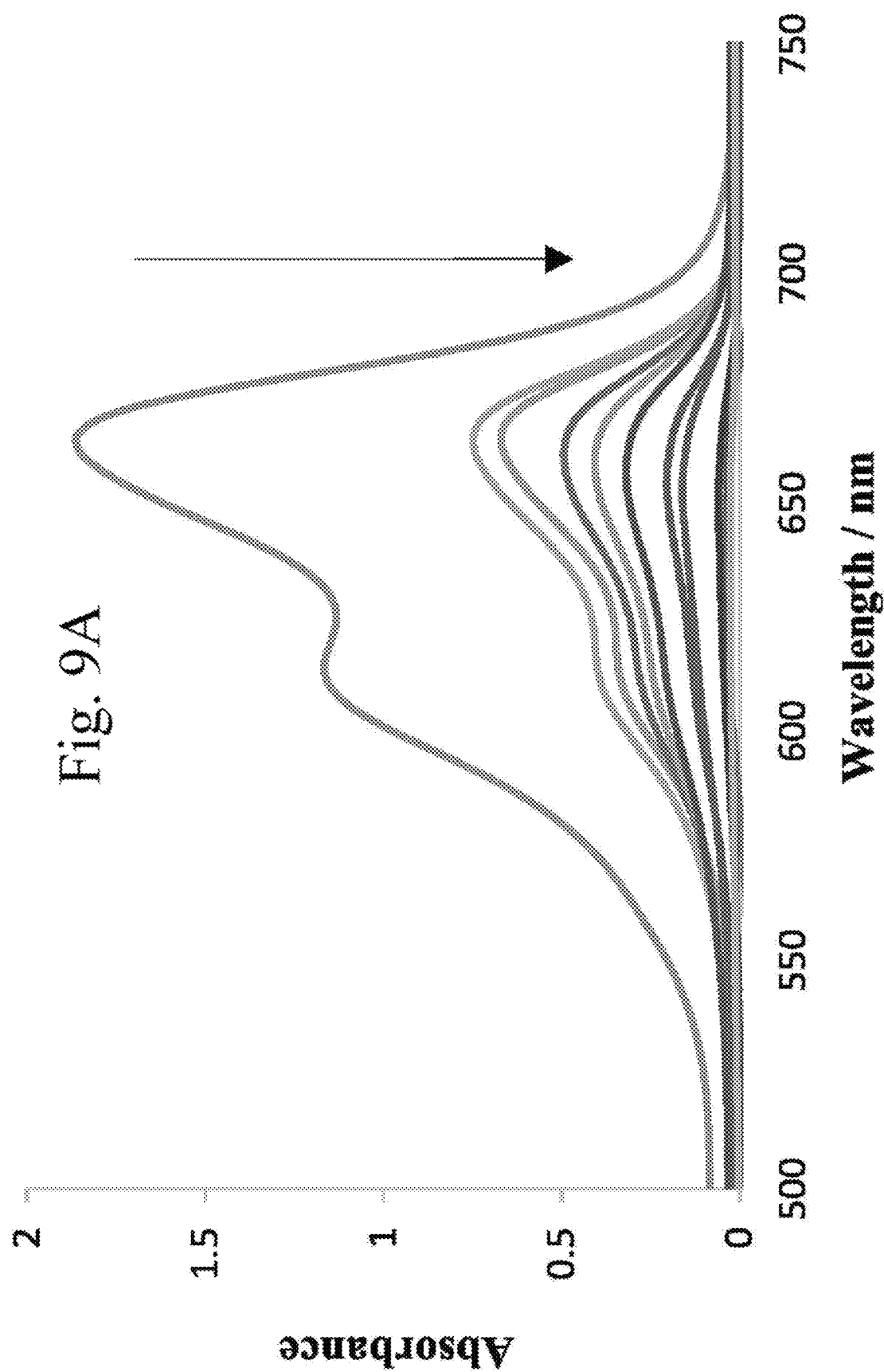
FIG. 9A shows the change in the UV-vis absorbance spectrum of aqueous solutions of methylene blue (MB) dye during UV-irradiation in the presence of PST0.5.
Figure 9C:
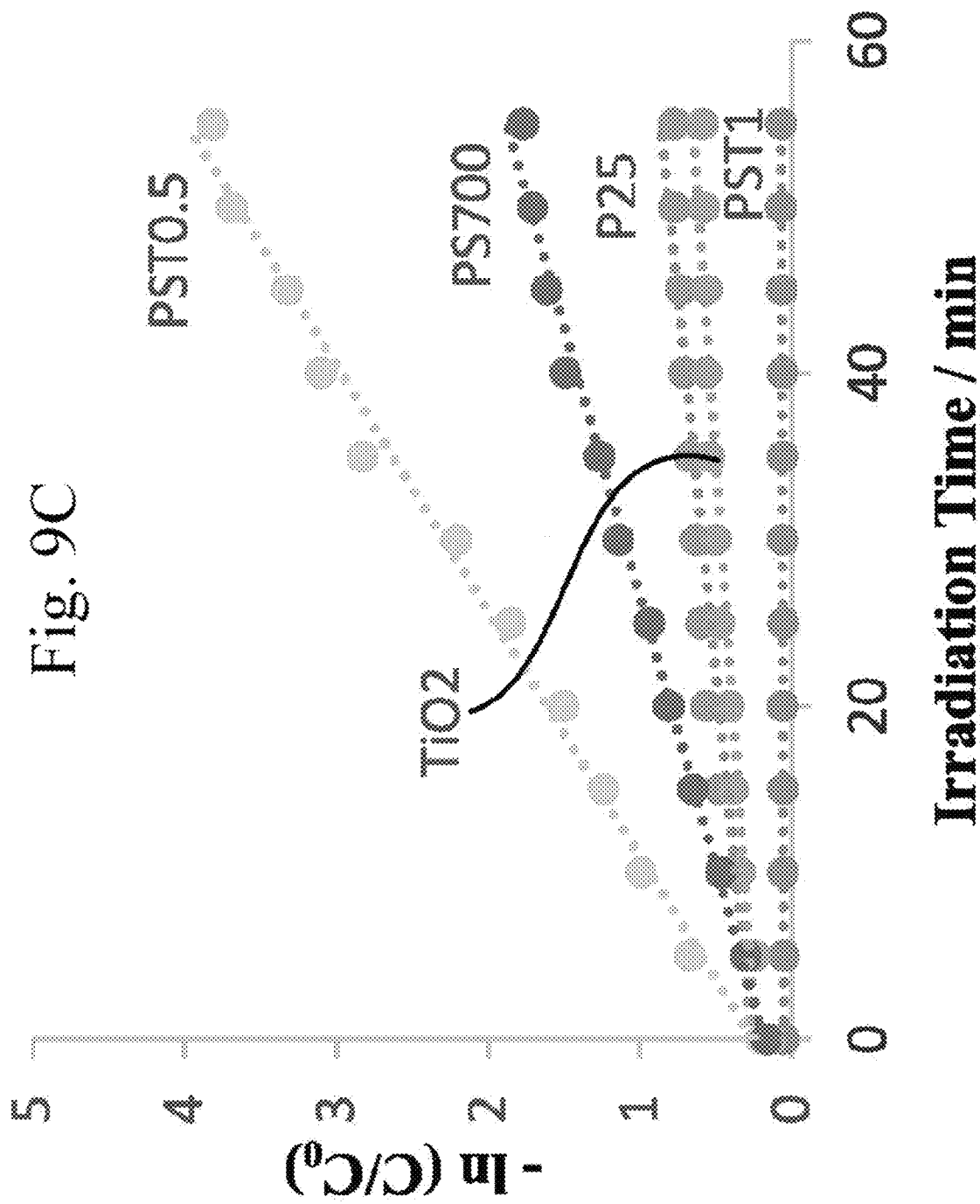
FIG. 9C shows a plot of the $ln(C/C_0)$ with irradiation time in the presence of different photocatalysts described herein.
Figure 9D:
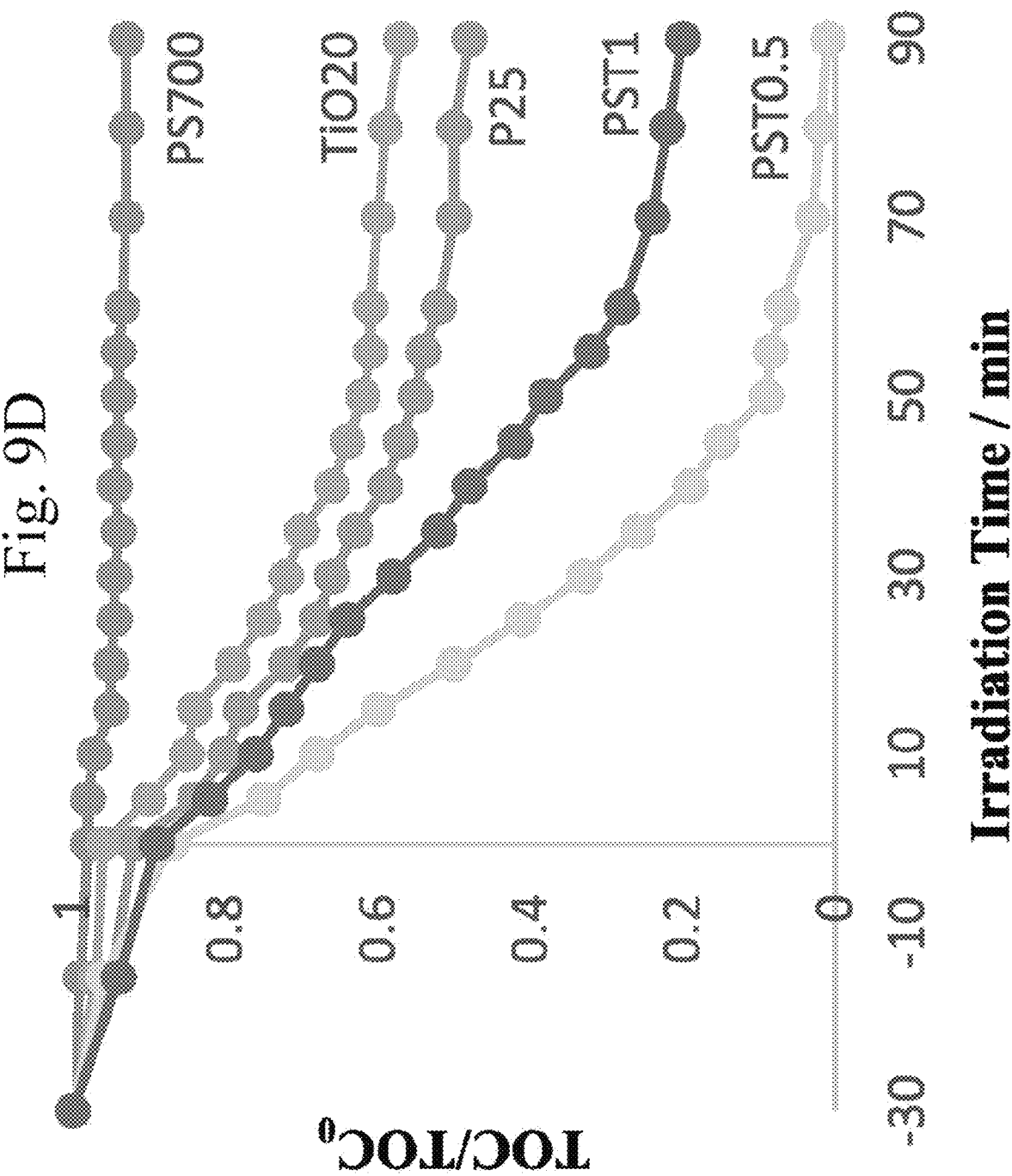
FIG. 9D shows a plot of the change of total organic carbon (TOC) during photocatalytic degradation of methylene blue (MB) in the presence of photocatalysts described herein under UV light irradiation.
Figure 9E:
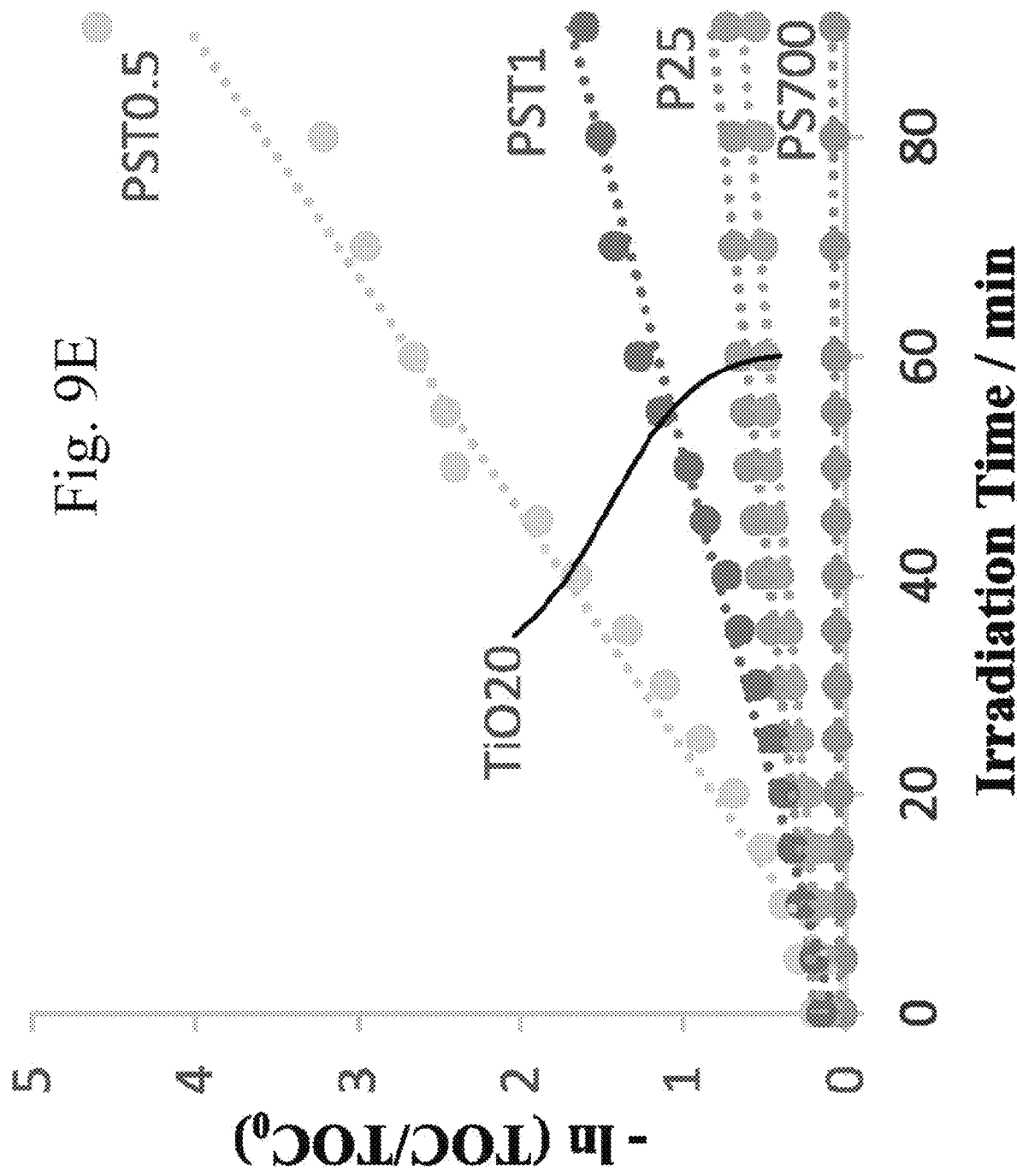
FIG. 9E shows a plot of the $ln(TOC/TOC_0)$ with irradiation time in the presence of different photocatalysts described herein.

Photocatalytic performance FIG. 9A to 9E show the UV-vis absorption spectra and data studying the effect of the nanomaterials produced as described herein on an aqueous solution of methylene blue (MB) during the UV illumination. The kinetic parameters of the photocatalytic degradation as well as mineralization of MB according to the data from FIG. 9C and 9E are presented in below in Table 3.

TABLE 3

Kinetic parameters for MB degradation from data shown in FIG. 9C and 9E.

| Photocatalyst | $K_C$ (/min) | $R^2$ | $K_{TOC}$ (/min) | $R^2$ |
|---|---|---|---|---|
| P25 | 0.0109 | 0.92 | 0.0071 | 0.942 |
| TiO20 | 0.0075 | 0.89 | 0.0052 | 0.921 |
| PST0.5 | 0.0678 | 0.992 | 0.0462 | 0.968 |
| PST1 | 0.0308 | 0.993 | 0.018 | 0.982 |

An increase in the pseudo first order rate constants for MB degradation ($K_C$) compared to the rate constants of MB mineralization ($K_{TOC}$) indicates that intermediates may be formed during photocatalytic degradation of MB.

Referring now to the drawings, wherein like reference numerals designate identical or corresponding parts throughout the several views.

FIG. 1 shows a schematic representation of a catalytic transformation of car bumper waste to carbon based nanomaterials as described herein, wherein $TIO_2$ powder is added to the chips of bumper material and pyrolyzed into a black powder containing carbon nanomaterials and $TIO_2$, except in the case of the uncatalyzed pyrolysis.

FIG. 2 shows the XRD patterns of the raw car bumper before thermal treatment, PS0, the $TiO_2$ nanoparticles prepared as described herein, $TIO_2$, the car bumper material after thermal treatment at 700° C. in the absence of $TiO_2$, PS700, the car bumper material after pyrolysis at 700° C. in the presence of 0.5 g of $TiO_2$, PST0.5, and the car bumper material after pyrolysis at 700° C. in the presence of 1 g of $TiO_2$, PST1. The XRD of the raw car bumper, PSO, shows a sharp peak at 19.5° characteristic of polystyrene. The XRD pattern of the as prepared $TiO_2$ nanoparticles, $TiO_2$, shows the diffraction peaks of both anatase and rutile phases with peaks can be well indexed to the (1 0 1), (0 0 4) and (2 0 0) reflections of anatase phase (JCPDS no. 21-1272), and the (1 1 0), (1 0 1), (1 1 1) and (2 1 1) reflections of rutile phase (JCPDS no. 21-1276). The percentages of anatase and rutile phase in the sample have been calculated from the integrated intensities of anatase (1 0 1) and rutile (1 1 0) to be 20.5% anatase and 79.5% rutile. The XRD pattern of the car bumper after thermal treatment in the absence of $TiO_2$ nanoparticles, PS700, shows a broad peak at 24.5° which is attributed to reduced graphene oxide sheets (RGO). The XRD patterns of the bumper after thermal treatment in the presence of $TiO_2$ nanoparticles, i.e., PST0.5 and PST1, show the diffraction peaks of both anatase and rutile phases of $TiO_2$ with 87% anatase and 13% rutile for PST1 and 85% anatase and 15% rutile for PST0.5.

The presence of the car bumper material in the pyrolysis may hinder the anatase to rutile phase transformation at elevated temperature, instead occasioning a rutile to anatase phase transformation. The XRD of $TiO_2$ nanoparticles after thermal treatment in the absence of the waste car bumper at 700° C., $TiO_2$ 700, was measured for comparison. The XRD pattern of $TiO_2$ 700, showed the diffraction peaks of pure rutile phase confirming the phase transformation of $TiO_2$ from a mixed anatase-rutile phase $TiO_2$ to pure rutile phase $TiO_2$ under thermal treatment at 700° C. Moreover, the characteristic peaks assigned to RGO did not appear for PST0.5 and PST1 samples, which may be explained by overlap of the RGO peaks with anatase $TiO_2$ peaks.

FIG. 3 shows the Raman spectra of the raw car bumper before thermal treatment, PS0, the $TiO_2$ nanoparticles prepared as described herein, $TIO_2$, the $TiO_2$ nanoparticles after thermal treatment at 700° C., $TiO_2$ 700, the car bumper material after pyrolysis at 700° C. in the presence of 0.5 g of $TiO_2$, PST0.5, and the car bumper material after pyrolysis at 700° C. in the presence of 1 g of $TiO_2$, PST1. The Raman spectra of raw bumper before thermal treatment, PS0, and after thermal treatment in absence of $TiO_2$, PS700, show two sharp peaks at 1341 $cm^{-1}$, which can be attributed to the disorder carbon (D band), and 1603 $cm^{-1}$, which can be attributed to the graphitic carbon (G band). An increase in the intensity of the D band as compared to the G band can be observed for PS700 sample, which indicates the removal of oxygen and indicates the transformation of polymer waste (polystyrene) to reduced graphene oxide. The Raman spectrum of $TiO_2$ before thermal treatment, PS0, shows the bands at 234 $cm^{-1}$ ($E_g$), 432 $cm^{-1}$ ($E_g$), and 612 $cm^{-1}$ ($A_{1g}$) due to rutile phase $TiO_2$. The Raman spectra of the car bumper material after thermal treatment in the presence of $TiO_2$, PST0.5 and PST1, show the D and G bands of graphitic carbon in addition to weak peaks at 390 $cm^{-1}$ ($B_{1g}$), 510 $cm^{-1}$ ($A_{1g}$), and 620 $cm^{-1}$ ($E_g$) and an intense peak at 140 $cm^{-1}$-corresponding to the characteristic modes of anatase phase $TiO_2$.

Figure 4A:
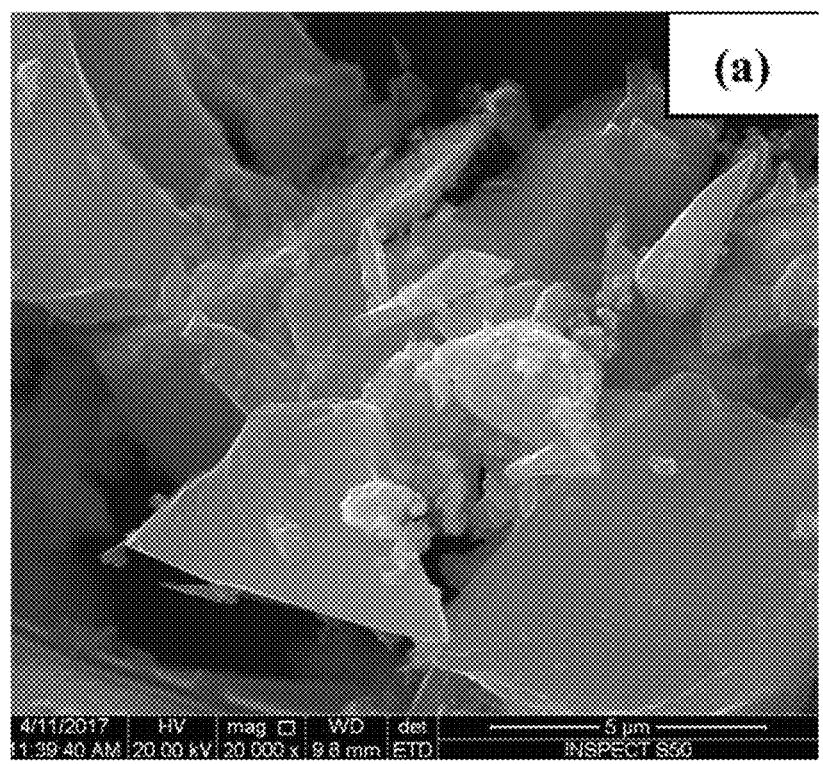
FIG. 4A shows a scanning electron microscope (SEM) image of car bumper waste material after pyrolysis at 700° C. in inert atmosphere in the absence of $TiO_2$, PS700.
Figure 4B:
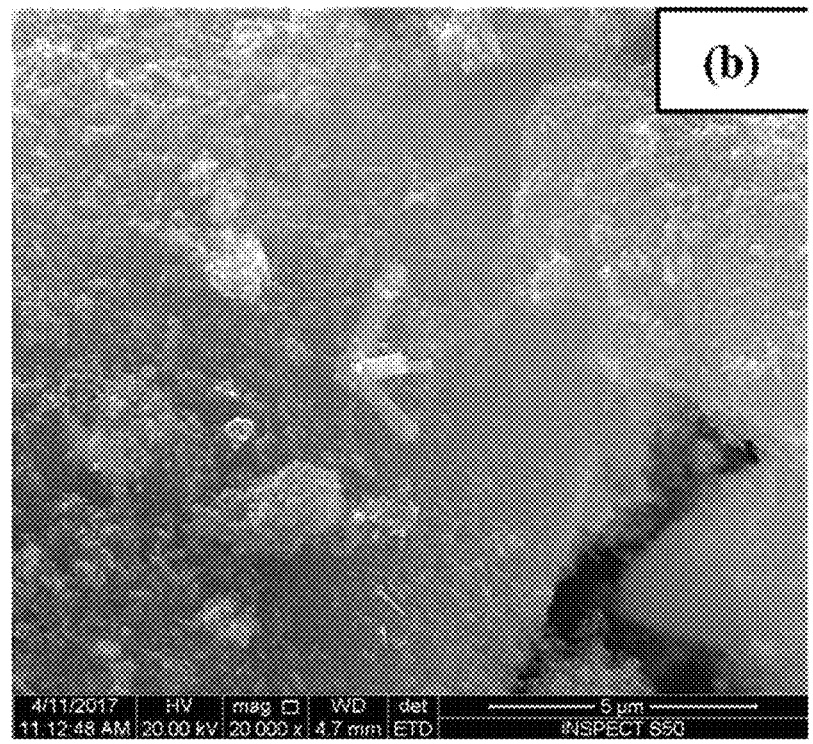
FIG. 4B shows an SEM image of car bumper waste material after pyrolysis at 700° C. in inert atmosphere in the presence of 0.5 g $TiO_2$ nanoparticles, PST0.5.
Figure 4C:
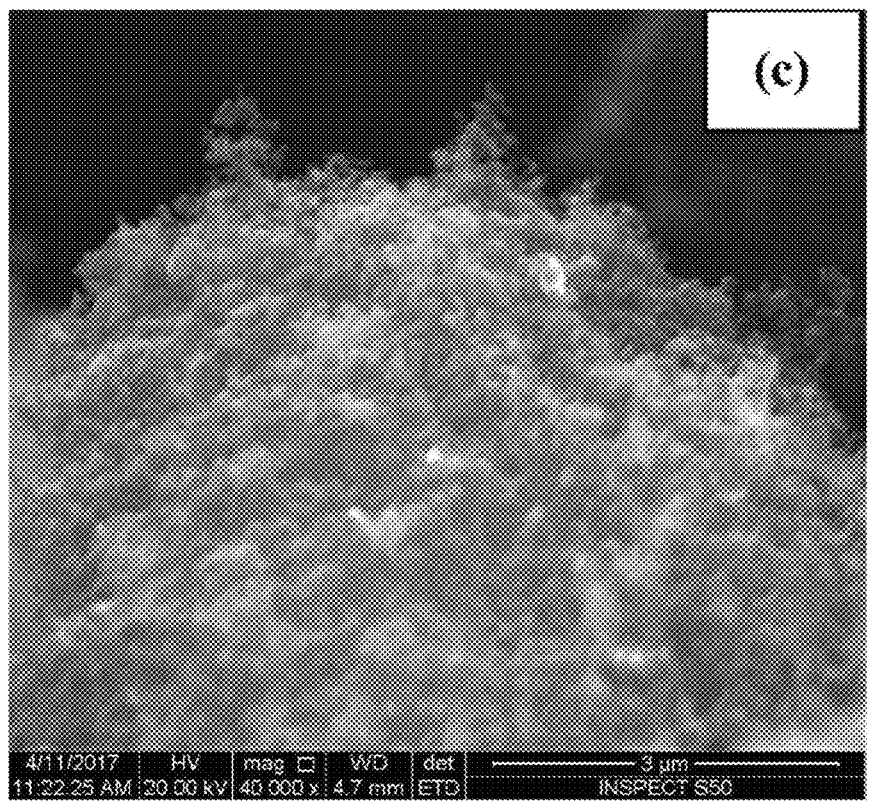
FIG. 4C shows an SEM image of car bumper waste material after pyrolysis at 700° C. in inert atmosphere in the presence of 1 g $TiO_2$ nanoparticles, PST1.

FIG. 4A to 4C shows the SEM images of the car bumper material after thermal treatment in the absence of $TiO_2$, PS700 (FIG. 4A), in the presence of 0.5 g $TiO_2$, PST0.5 (FIG. 4B), and in the presence of 1 g, PST1 (FIG. 4C). The SEM image of PS700 in FIG. 4A shows dense layers of carbon materials. The SEM images of PST0.5 in FIG. 4B and PST1 in FIG. 4C show agglomeration of $TiO_2$ nanoparticles on carbon layers.

Figure 5A:
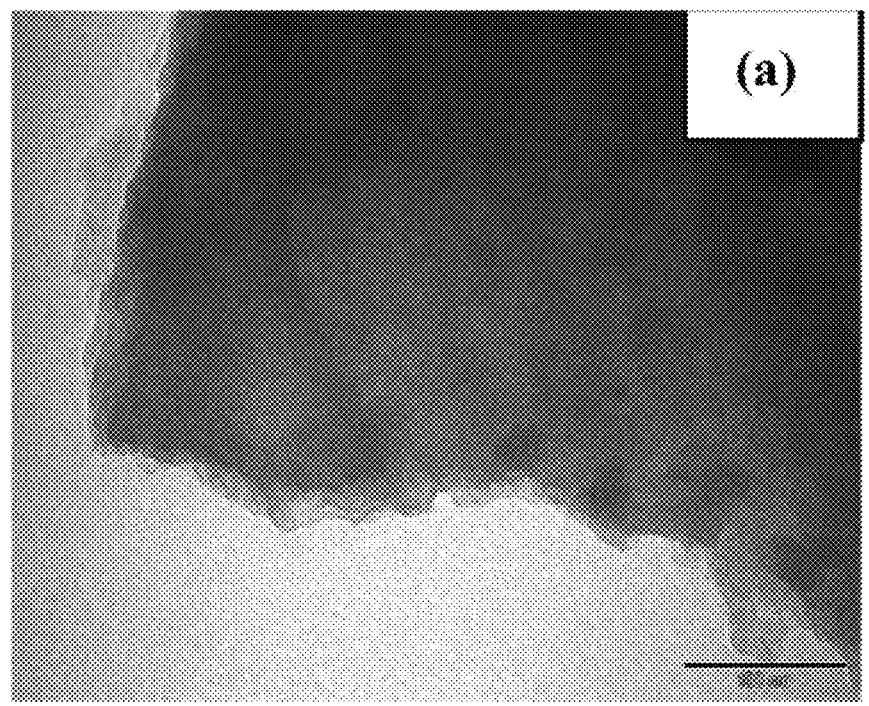
FIG. 5A shows a transmission electron microscope (TEM) image of car bumper material after thermal treatment at 700° C. in the absence of $TiO_2$ nanoparticles.
Figure 5B:
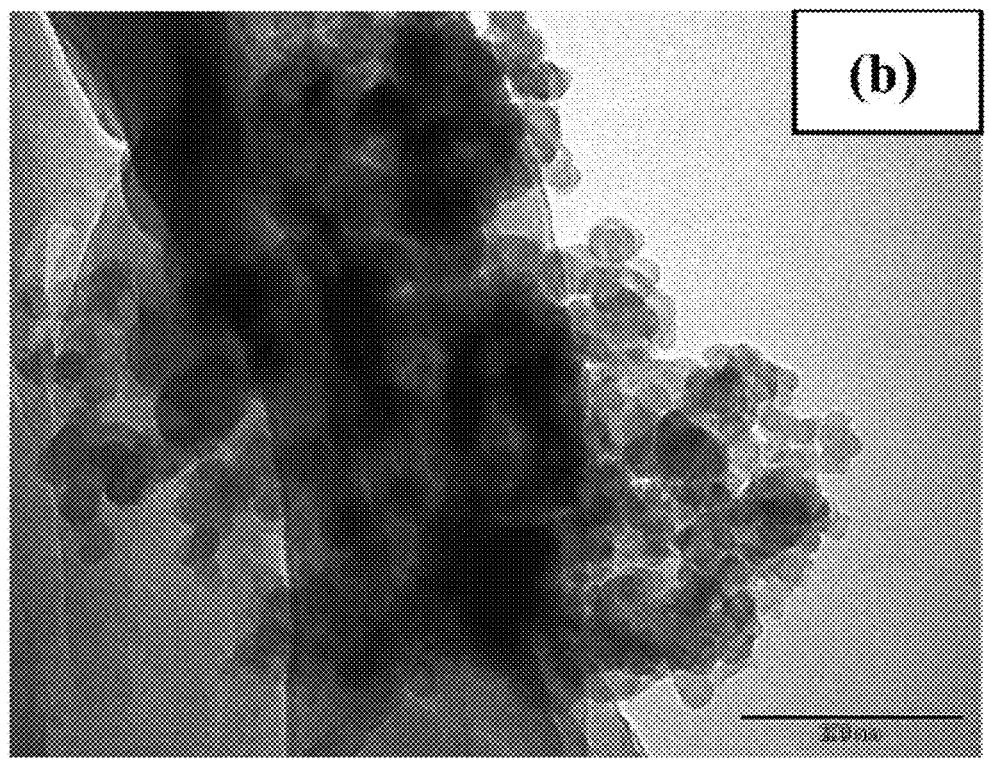
FIG. 5B shows a TEM image of composite nanomaterials produced from thermal treatment of car bumper waste material in the presence of 0.5 g of $TiO_2$, PST0.5.
Figure 5C:
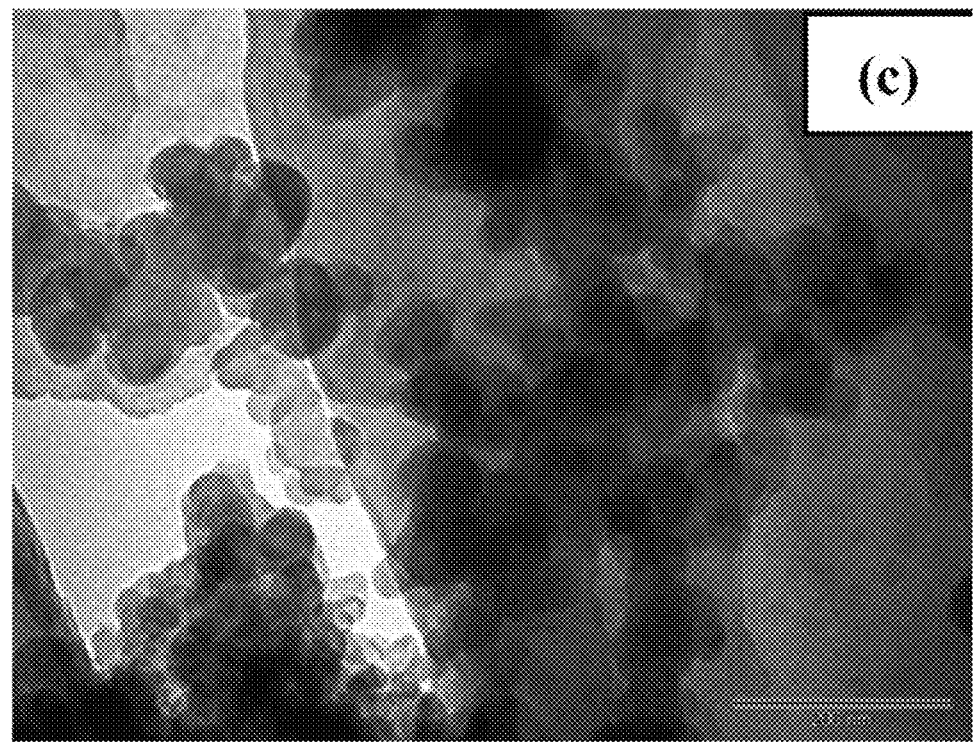
FIG. 5C shows a TEM image of composite nanomaterials produced from thermal treatment of car bumper waste material in the presence of 1 g of $TiO_2$, PST1.
Figure 5D:
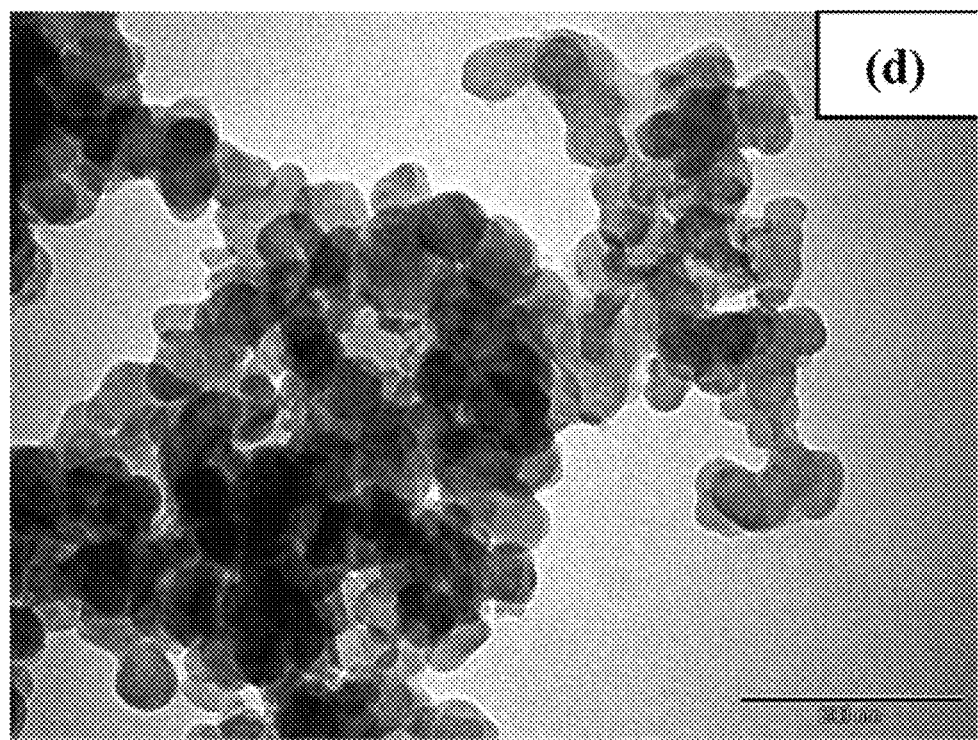
FIG. 5D shows a zoomed in TEM image of $TiO_2$ agglomeration in a PST0.5 sample.
Figure 5E:
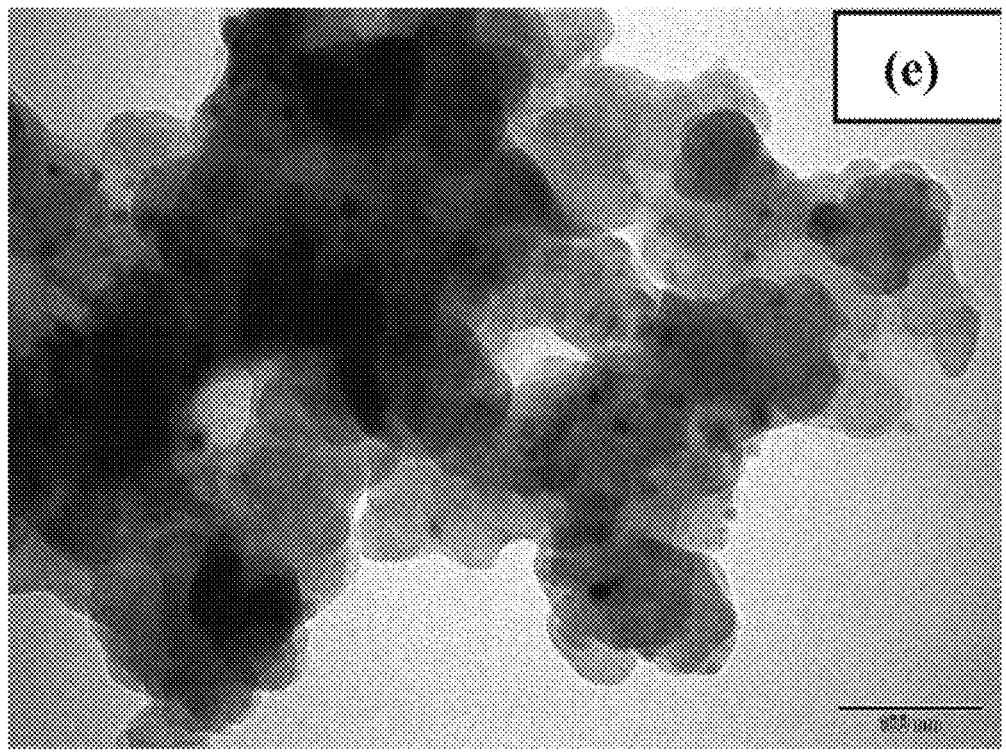
FIG. 5E shows a zoomed in TEM image of $TiO_2$ agglomeration in a PST0.5 sample.
Figure 5F:
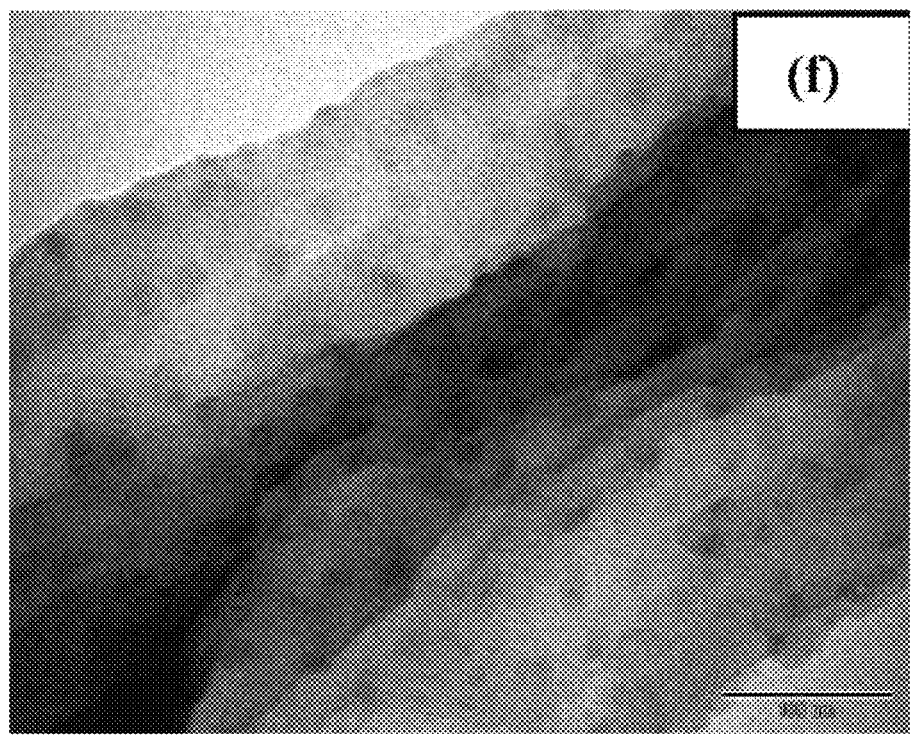
FIG. 5F shows a TEM image of a focused area of carbon sheets in a PST0.5 sample indicating the presence of carbon dots in and/or on the carbon sheets.
Figure 5G:
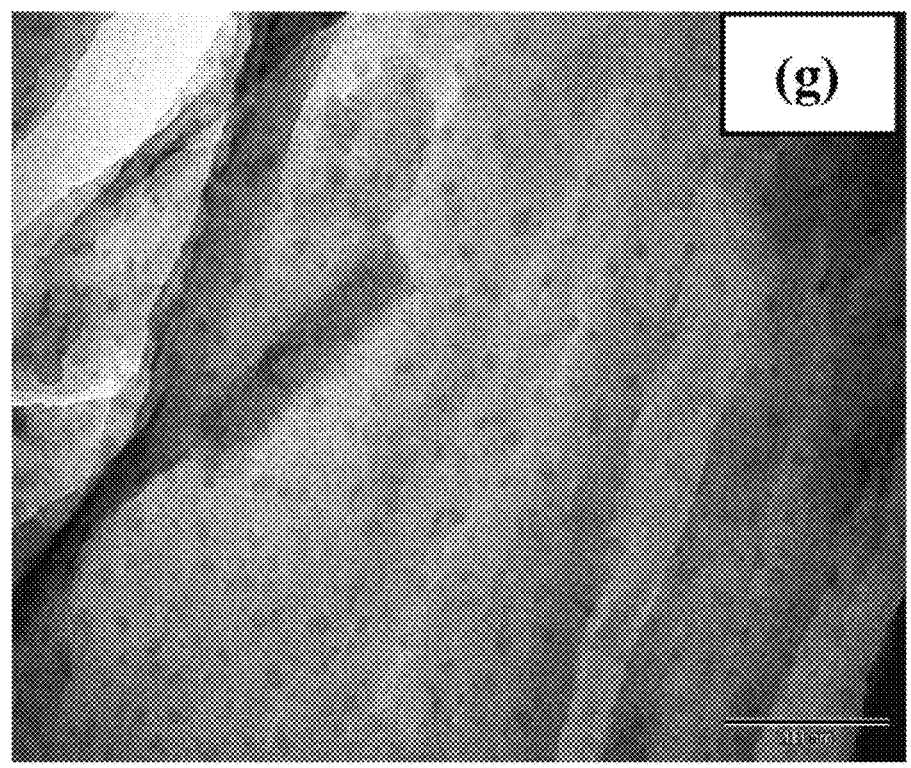
FIG. 5G shows a TEM image of an area of carbon sheets in a PST0.5 sample with carbon dots.
Figure 5H:
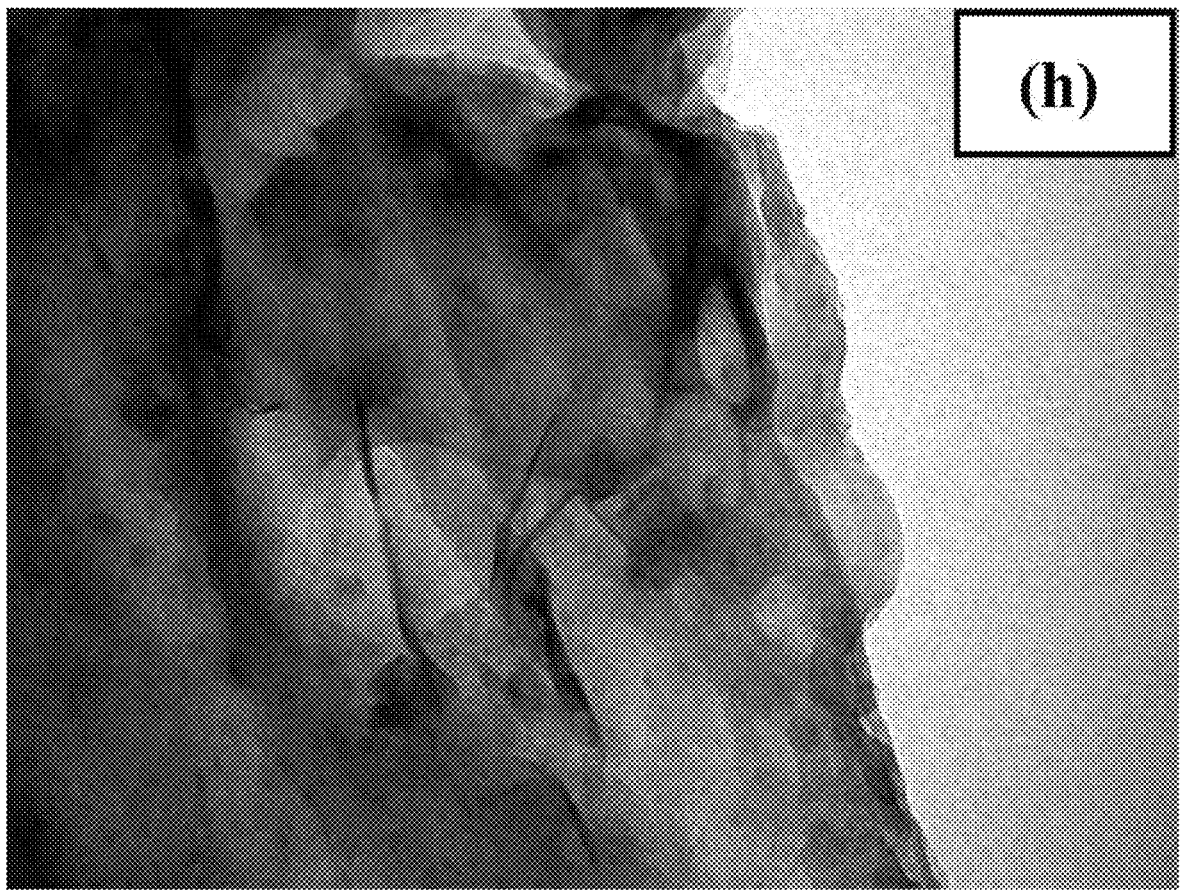
FIG. 5H shows a TEM image of an area of carbon sheets in a PST0.5 sample with carbon dots.

FIG. 5A to 5H shows the TEM images of car bumper material after thermal treatment in the absence of $TiO_2$, PS700, in the presence of 0.5 g of $TiO_2$, PST0.5, and in the presence of 1 g of $TiO_2$, PST1. FIG. 5A shows the TEM image of car bumper material after thermal treatment in the absence of $TiO_2$ nanoparticles indicating porous carbon nanomaterial sheets. FIG. 5B shows a TEM image of composite nanomaterials produced from thermal treatment of car bumper waste material in the presence of 0.5 g of $TiO_2$, PST0.5, showing agglomerated $TiO_2$ nanoparticles anchored on porous carbon nanomaterials sheets. FIG. 5C shows a TEM image of composite nanomaterials produced from thermal treatment of car bumper waste material in the presence of 1 g of $TiO_2$, PST1, showing agglomerated $TiO_2$ nanoparticles anchored on porous carbon nanomaterials sheets. The TEM images in FIG. 5D and 5E show focused areas of a $TiO_2$ agglomeration in a PST0.5 sample indicating that the $TiO_2$ agglomeration comprises nanoparticles with an average size of ca. 50 nm. The TEM images in FIG. 5F to 5H show focused areas of carbon sheets in a PST0.5 sample, wherein thin sheets of reduced graphene oxide decorated with carbon dots can be observed. The results shown in FIG. 5F to 5H indicate that the morphology of the carbon nanomaterials produced as described herein has been changed upon using $TiO_2$ as a catalyst in the pyrolysis process. While porous reduced graphene oxide sheets were produced by the thermal pyrolysis of waste car bumper in absence of $TiO_2$ catalyst, as seen in FIG. 5A, reduced graphene oxide sheets comprising carbon dots were produced in the pyrolysis of car bumper material in presence of $TiO_2$ catalyst, as seen in FIG. 5F to 5H.

FIG. 6 shows the thermal gravimetric analysis (TGA) of PS700, PST0.5, and PST1, each showing weight loss consisting of two main stages. The first TGA stage is from room temperature to 120° C., which should mainly be due to the loss of adsorbed water. The second TGA stage is at approximately 450° C. and may be attributed to the thermal decomposition of the carbon nanomaterials. The TGA results show the excellent thermal stability of the nanocomposites produced as described herein. Furthermore, the thermal stability of the nanocomposites appears to increase with increasing $TiO_2$ percentage.

FIG. 7 shows $N_2$ adsorption desorption and surface area measurements of the bumper material after thermal treatment at 700° C. in the absence of $TiO_2$, PS700, in the presence of 0.5 g of $TiO_2$, PST0.5, and in the presence of 1 g $TiO_2$, PST1. The $N_2$ adsorption-desorption measurements indicate a porous structure of the produced carbon nanomaterials and $TiO_2$-quantum dots (QD)-reduced graphene oxide (RGO) nanocomposite materials. The BET surface area and the average pore size of the carbon nanomaterials produced by the thermal treatment of car bumper materials in absence of $TiO_2$ (PS700) is higher than those in the presence of $TiO_2$ nanoparticles (PST0.5, PST1). The results indicate that the surface area and pore size may also decrease with increasing $TiO_2$ percent in the carbon nanomaterials samples. The results may be explained by the blocking of the porous carbon surfaces by the $TiO_2$ nanoparticles. The $N_2$ adsorption characteristic values of all samples measured are given above in Table 2.

FIG. 8 shows UV-vis diffuse reflectance spectra of the samples, TiO2, PS700, PST0.5, and PST1. The reflectance spectra of $TiO_2$ exhibits typical UV-vis pattern of $TiO_2$ nanoparticles including broad reflectance in the visible region of the spectrum. The reflectance values are lower for the PST 0.5 and PST 1 samples, indicating high absorption of light and evidencing that the carbon nanomaterials produced with $TiO_2$, i.e., graphene oxide, extend the absorbance into visible region, 380 to 800 nm.

FIG. 9A to 9E show the UV-vis absorption spectra and data studying the effect of the nanomaterials produced as described herein on an aqueous solution of methylene blue (MB) during the UV illumination. FIG. 9A shows the UV-vis absorption spectra of an aqueous solution of MB during the UV illumination in the presence of PST0.5. The absorption peak intensity of MB decreases with illumination time, almost vanishing at around 120 minutes.

FIG. 9B shows the photocatalytic degradation efficiency of methylene blue (MB) as the variation of $C/C_0$ with irradiation time in the presence of carbon nanomaterials produced by pyrolyzing car bumper waste in the absence of $TiO_2$, PS700, in the presence of 0.5 g of $TiO_2$, PST0.5, in the presence of 1 g of $TiO_2$, PST1, pure $TiO_2$ nanoparticles having undergone the 700° C. heat treatment, $TiO_2$, and Degussa P25 $TiO_2$, P25, which was used as a benchmark for comparison of the photocatalytic activity with the created carbon nanomaterials.

The results shown in FIG. 9B to 9E indicate that the photocatalytic activity was enhanced in the presence of $TiO_2$ nanoparticles. The $TiO_2$-carbon dots (CD)-reduced graphene oxide (RGO) composites obtained as described above with 0.5 and 1 g of $TiO_2$ in the 700° C. pyrolysis of car bumper waste material, i.e., PS0.5 and PS1, exhibited enhanced photocatalytic activity for the degradation of MB dye compared to pure $TiO_2$, $TiO_2$ or P25. The enhancement of photocatalytic activity may be attributed to the high electron pair separation achieved by the electronic interaction between $TiO_2$ and porous RGO-CD carbon nanomaterials produced from car bumper materials.

As seen in FIG. 9B to 9E the highest photocatalytic activity was obtained for PST0.5 with a carbon-to-$TiO_2$ ratio of 2:1 compared to PST1 with a carbon-to-$TiO_2$ ratio of 1:1. This higher activity may indicate increasing photocatalytic activity with increasing the RGO content in the samples and/or a critical range in the ratio of carbon-to-$TiO_2$ ratio.

The hybridization of $TiO_2$ with RGO can enhance the photocatalytic activity of $TiO_2$, possibly owing to electronic conductive properties of the resulting $TiO_2$-RGO nanocomposite, and/or increasing (BET) specific surface area. Furthermore, RGO can be used as an electron transfer medium, which can restrain the recombination of photogenerated electrons and holes, and extend the lifetime of photogenerated electrons. The photocatalytic degradation of organic compounds, such as methylene blue (MB), can be enhanced using $TiO_2$-RGO composites, rather than using pure $TiO_2$ nanoparticles.

FIG. 9D shows the change of total organic carbon (TOC) during photocatalytic degradation of methylene blue (MB) in the presence of P25, $TiO_2$, PS700, PST0.5, and PST1 under UV light irradiation. The TOC measurements indicate the disappearance of the organic carbon when MB and the photocatalyst ($TiO_2$, PST0.5 or PST1) are exposed to UV light. The results in FIG. 9D show TOC decreases of 99.93% for PST0.5, 72.10% for PST1, or 39.71% for $TiO_2$, obtained after UV light irradiation for 60 minutes with the respective photocatalysts.

FIG. 9C and 9E respectively show plots of $\ln(C/C_0)$ and $\ln(TOC/TOC_0)$ against irradiation time for the photocatalytic degradation and mineralization of methylene blue (MB). The kinetic parameters of the photocatalytic degradation as well as mineralization of MB according to the data from FIG. 9C and 9E are presented in above in Table 3. An increase in the pseudo first order rate constants for MB degradation ($K_C$) compared to the rate constants of MB mineralization ($K_{TOC}$) indicates that intermediates may be formed during photocatalytic degradation of MB.

Figure 10:
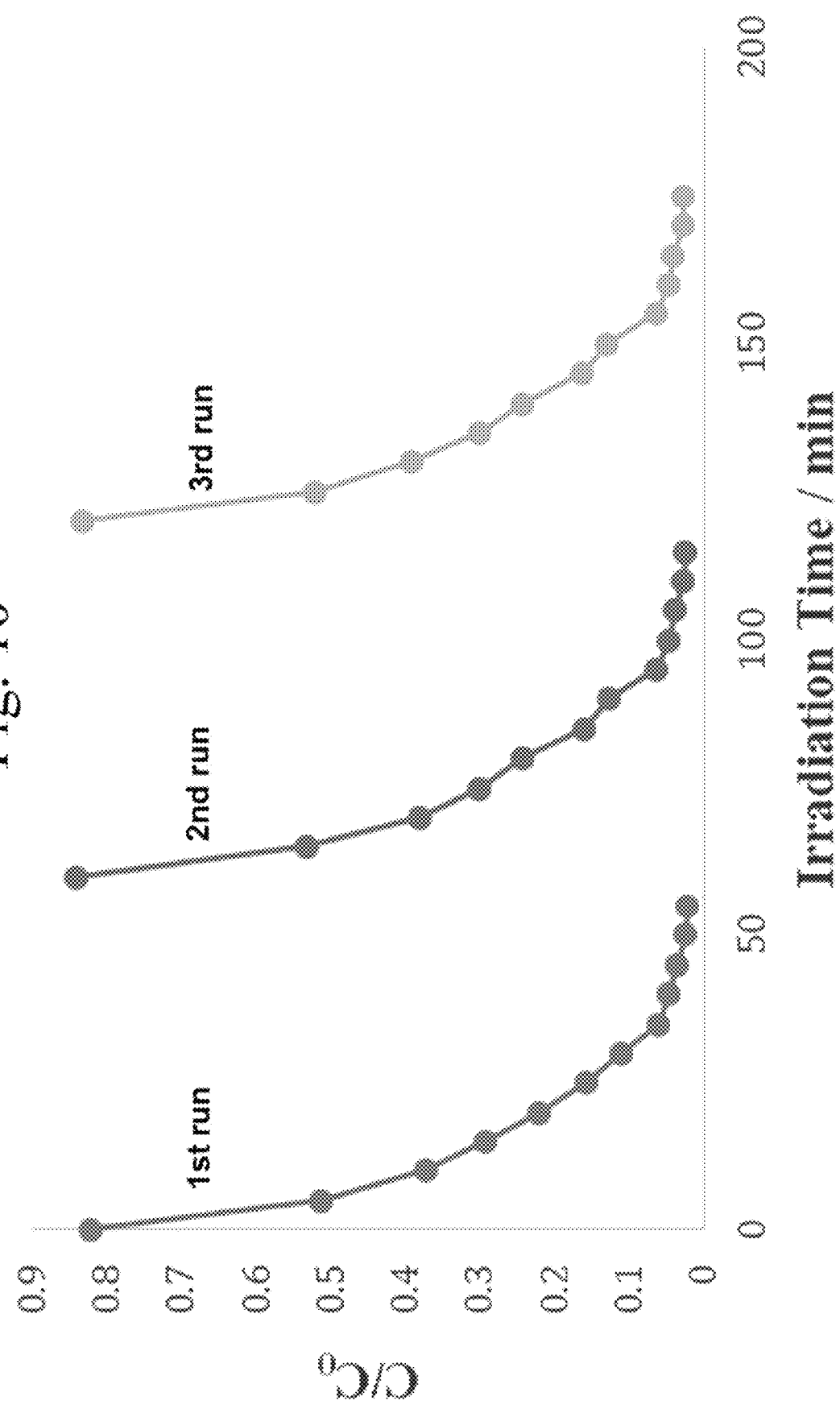
FIG. 10 shows plots of the recycle use of PST0.5 at 1 g/L for the photocatalytic degradation of 20 ppm of methylene blue (MB).

FIG. 10 shows an evaluation of the recyclability of the waste-based nanocomposites created as described herein, from an environmental point of view. The recyclability was evaluated by carrying out the photocatalytic experiment three times using the PST0.5 nanocomposite. After each run the nanocomposite particles were collected, washed with distilled water 3 times by centrifugation, and then dried at 60° C. for 1 hour for the use in the next run. FIG. 10 shows the results of the recycle use of 1 g/L PST0.5 for the degradation of 20 ppm methylene blue (MB). There is almost no change in the photocatalytic efficiency of the nanocomposite after three recycling uses of the same catalyst, evidencing good stability of the waste-based nanocomposites described herein. The maintained efficiency of inventive materials after 3, 5, 10, 15, 20, 25, or 50 uses may be, for example, at least 75, 80, 85, 90, 92.5, 95, 97.5, 98, 99, 99.1, 99.5, or 99.9.% of the original catalytic activity. The amount of composite-to-organic compound weight ratio may be 10:1, 5:1, 2:1, 1:1, 1:2, 1:5, 1:10, 1:25, 1:50, 1:100, or 1:1000, whereby higher composite-to-organic compound weight ratios may be implemented in filter-type arrangements.

Numerous modifications and variations of the present invention are possible in light of the above teachings. It is therefore to be understood that within the scope of the appended claims, the invention may be practiced otherwise than as specifically described herein.

The invention claimed is:

1. A method of upcycling vehicle exterior waste containing organic polymer waste material, the method comprising:
   cutting the vehicle exterior waste into pieces having a surface area of up to 25 $cm^2$ to form a cut organic polymer waste material,
   pyrolyzing a solid mixture of the cut organic polymer waste material and $TiO_2$ particles in an inert atmosphere at a temperature in the range of 500 to 900° C., to thereby upcycle the vehicle exterior waste and obtain a composite comprising a reduced graphene oxide and 10 to 50 wt. % of $TiO_2$ based on a total weight of the composite,
   wherein carbon quantum dots are present on the reduced graphene oxide.

2. The method of claim 1, wherein the reduced graphene oxide is in the form of sheets and/or plates.

3. The method of claim 1, wherein the vehicle exterior waste is car bumper material.

4. The method of claim 1, wherein the vehicle exterior waste comprises a styrenic polymer.

5. The method of claim 1, wherein the vehicle exterior waste comprises an olefinic polymer.

6. A composition, comprising:
   reduced graphene oxide sheets and/or plates;
   10 to 50 wt. %, based on total composition weight, of $TiO_2$ particles dispersed in and/or on the reduced graphene oxide sheets and/or plates,
   wherein at least a portion of the reduced graphene oxide sheets and/or plates is decorated with carbon quantum dots, and
   wherein the $TiO_2$ particles comprise $TiO_2$ in anatase phase.

7. The composition of claim 6, wherein the reduced graphene oxide is present in an amount of 90 to 50 wt. %, based on the total weight of the composition.

8. The composition of claim 6, wherein a fraction of Ti from the $TiO_2$, as a total fraction of all Ti present in the composition, is at least 95 atom. %.

9. The composition of claim 6, wherein the Ti as a percentage of all metals present in the composition is at least 90 atom. %.

10. The composition of claim 6, wherein the reduced graphene oxide is at least 75 wt. % of all carbon present in the composition.

11. The composition of claim 6, wherein an average diameter of the $TiO_2$ particles is in a range of from 15 to 55 nm.

12. The composition of claim 6, having a BET surface area in a range of from 50 to 110 $m^2$/g.

13. The composition of claim 6, having an average pore volume in a range of from 0.025 to 0.095 $cm^3$/g.

14. The composition of claim 6, having an average pore size in a range of from 17 to 18.25 nm.

15. The composition of claim 6, wherein at least 50 wt % of the total weight of the composition is from carbon.

16. The composition of claim 6, wherein the $TiO_2$ particles are present in the composition in a range of from 15 to 45 wt. %, based on the total weight of the composition.

17. A method of making the composition of claim 6, the method comprising:
   pyrolyzing a mixture comprising $TiO_2$ particles and fragments of car bumpers in an inert atmosphere at a temperature in the range of 500 to 900° C.; and
   cooling, to obtain the composition.

18. A method of decomposing one or more organic materials, the method comprising:
   mixing or contacting the composition of claim 6 with an aqueous solution comprising an organic material, to form a mixture or a contact surface, and
   irradiating the mixture or the contact surface with sunlight and/or synthetic light in a wavelength range of from 100 to 1000 nm.

19. The method of claim 18, wherein the composite comprises the $TiO_2$ particles in a range of from 15 to 45 wt. %.

20. The composition of claim 6, wherein the carbon quantum dots are present on the reduced graphene oxide sheets and/or plates at spacings of 10-90 nm.

\* \* \* \* \*